(12) United States Patent
Khalid et al.

(10) Patent No.: US 9,965,899 B2
(45) Date of Patent: May 8, 2018

(54) METHODS AND SYSTEMS FOR MINIMIZING PIXEL DATA TRANSMISSION IN A NETWORK-BASED VIRTUAL REALITY MEDIA DELIVERY CONFIGURATION

(71) Applicant: Verizon Patent and Licensing Inc., Arlington, VA (US)

(72) Inventors: Mohammad Raheel Khalid, Budd Lake, NJ (US); Ali Jaafar, Morristown, NJ (US); Alexandr Virodov, Metuchen, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 43 days.

(21) Appl. No.: 15/141,749

(22) Filed: Apr. 28, 2016

(65) Prior Publication Data

US 2017/0316607 A1    Nov. 2, 2017

(51) Int. Cl.
| | | |
|---|---|---|
| *G06T 19/00* | (2011.01) | |
| *G06F 3/01* | (2006.01) | |
| *G02B 27/01* | (2006.01) | |
| *H04L 29/06* | (2006.01) | |

(52) U.S. Cl.
CPC ........ *G06T 19/006* (2013.01); *G02B 27/0172* (2013.01); *G06F 3/013* (2013.01); *H04L 65/602* (2013.01); *G02B 2027/014* (2013.01)

(58) Field of Classification Search
CPC .............. G06T 19/006; G02B 27/0172; G02B 2027/014; G06F 3/013; H04L 65/602
See application file for complete search history.

(56) References Cited

U.S. PATENT DOCUMENTS

| | | | | |
|---|---|---|---|---|
| 2004/0104935 A1* | 6/2004 | Williamson | ............ | G06F 3/012 715/757 |
| 2004/0207635 A1* | 10/2004 | Miller | ............ | H04N 1/00 345/617 |
| 2010/0231588 A1* | 9/2010 | Barczak | ............ | G06T 15/405 345/422 |
| 2012/0146891 A1* | 6/2012 | Kalinli | ............ | H04N 19/33 345/156 |
| 2017/0221242 A1* | 8/2017 | Street | ............ | G06T 11/60 345/625 |
| 2017/0318235 A1* | 11/2017 | Schneider | ............ | H04N 5/2628 |

* cited by examiner

*Primary Examiner* — Xiao Wu
*Assistant Examiner* — Chong Wu

(57) ABSTRACT

An exemplary virtual reality media provider system ("system") manages data representative of an immersive virtual reality world ("world") and receives a request from a media player device ("device") for the device to receive a pixel data transmission representative of a particular scene of the world by way of a network. The device includes a head-mounted display screen worn by a user to view the particular scene as the user experiences the world. The system identifies pixel data representative of a set of pixels that constitute the particular scene and provides a minimized pixel data transmission representative of the particular scene to the device by transmitting a viewable pixel data subset corresponding to regions of the display screen predetermined to be viewable by the user and abstaining from transmitting an unviewable pixel data subset corresponding to regions of the display screen predetermined to be unviewable by the user.

19 Claims, 13 Drawing Sheets

METHODS AND SYSTEMS FOR MINIMIZING PIXEL DATA TRANSMISSION IN A NETWORK-BASED VIRTUAL REALITY MEDIA DELIVERY CONFIGURATION

BACKGROUND INFORMATION

Advances in computing and networking technology have made new forms of media content possible. For example, virtual reality media content is available that may immerse viewers (or "users") into interactive virtual reality worlds that the users may experience by directing their attention to any of a variety of things being presented in the immersive virtual reality world at the same time. For example, at any time during the presentation of the virtual reality media content, a user experiencing the virtual reality media content may look around the immersive virtual reality world in any direction with respect to both a horizontal dimension (e.g., forward, backward, left, right, etc.) as well as a vertical dimension (e.g., up, down, etc.), giving the user a sense that he or she is actually present in and experiencing the immersive virtual reality world.

For a user to experience an immersive virtual reality world, a backend server (e.g., a computing system operated by a virtual reality media provider) may be used to transmit pixel data representative of the immersive virtual reality world to a media player device associated with the user over a network. In this type of network-based virtual reality media delivery configuration, the media player device may use the pixel data to render a particular scene (e.g., a particular area of the immersive virtual reality world that the user is looking at) within the immersive virtual reality world in substantially real time as the pixel data is received by the media player device.

Unfortunately, transmitting pixel data representative of the entire immersive virtual reality world in high resolution may be an inefficient use of resources and/or may present other technical challenges. In particular, transmitting high-resolution pixel data representative of the entire immersive virtual reality world may utilize significant resources of the backend server providing the pixel data, the media player device receiving the pixel data, and/or the network carrying the pixel data.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
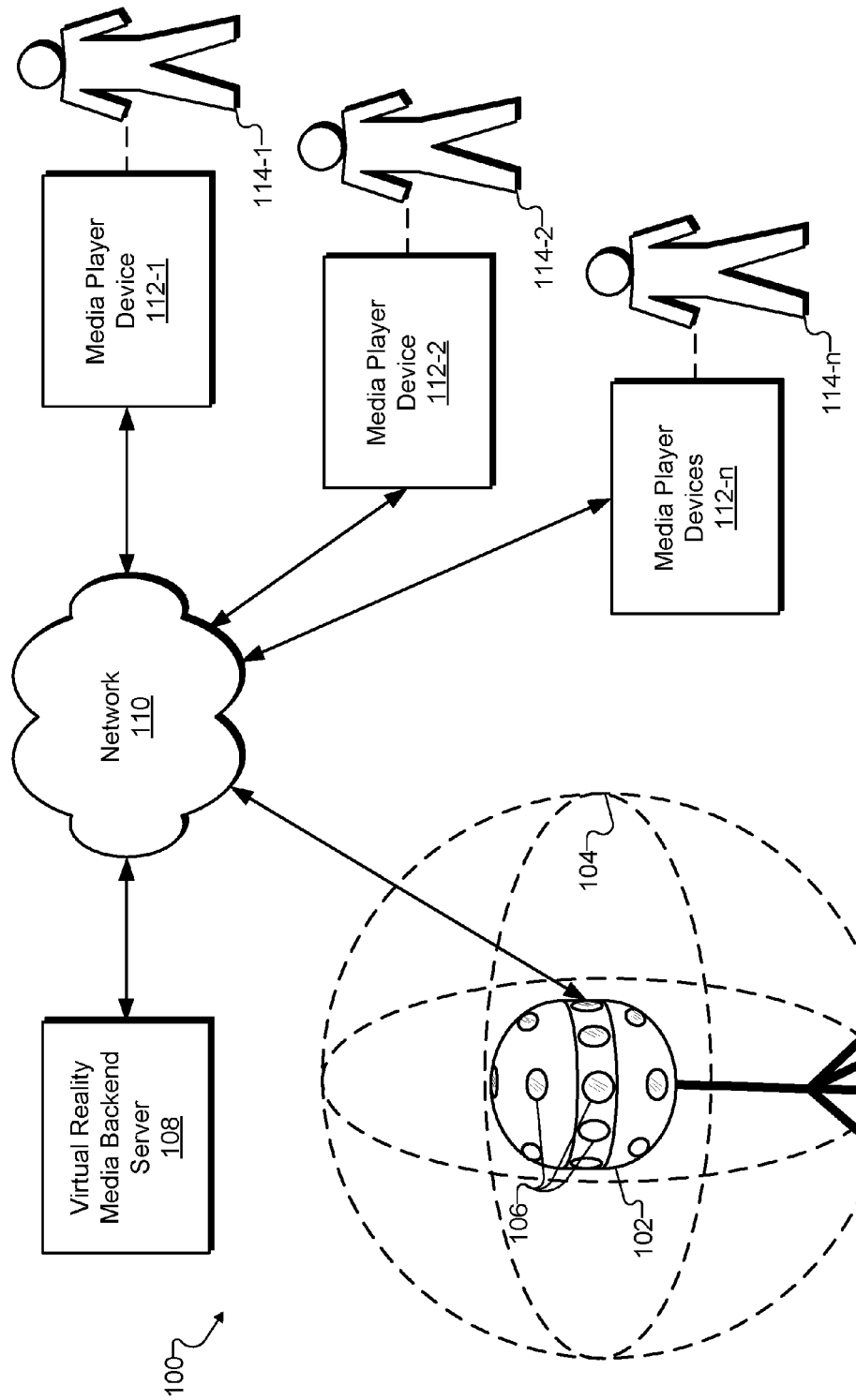
FIG. 1 illustrates an exemplary configuration in which exemplary implementations of a 360-degree camera, a virtual reality media backend server, and one or more media player devices operate to facilitate minimizing pixel data transmission in a network-based virtual reality media delivery configuration according to principles described herein.

Methods and systems for minimizing pixel data transmission in a network-based virtual reality media delivery configuration are described herein. For example, as used herein, transmissions of pixel data may be "minimized" by reducing an amount of pixel data being transmitted from an amount of pixel data that may otherwise be transmitted if techniques for minimizing pixel data transmissions (e.g., techniques described herein) were not used. As will be described below, pixel data transmissions may be minimized in various ways including by reducing (e.g., filtering) a number of pixels represented in transmitted pixel data, by reducing the amount of pixel data used to represent each pixel represented in the transmitted pixel data (e.g., by reducing the pixel resolution, color quality, etc., of one or more of the pixels), or by otherwise reducing the amount of pixel data transmitted in another suitable way. In some examples, a minimized pixel data transmission may include transmitting an absolute minimum amount of pixel data (e.g., an absolute minimum amount of pixel data that may still meet a particular quality threshold). In other examples, a minimized pixel data transmission may include transmitting a reduced amount of pixel data that may not represent an absolute minimum amount of pixel data that could be transmitted (e.g., to meet the particular quality threshold). In other words, in certain examples, a particular minimized pixel data transmission may be further minimized (i.e., reduced)

by employing different or additional pixel minimizing methods and techniques described herein and/or as may serve a particular implementation.

To this end, as will be described and illustrated below, a virtual reality media provider system may manage virtual reality world data representative of an immersive virtual reality world. The virtual reality media provider system may receive a request from a media player device by way of a network that interconnects the virtual reality media provider system and the media player device. The request may be for the media player device to receive a pixel data transmission representative of a particular scene of the immersive virtual reality world. For example, the particular scene may be a part of the immersive virtual reality world that the user is experiencing (e.g., looking at) using a head-mounted display screen included with the media player device and worn by the user (e.g., as part of a head-mounted virtual reality device or headset associated with the media player device), and the request may include motion data representative of the user's head movements as the user experiences the immersive virtual reality world using the head-mounted display screen (e.g., by turning his or her head to look from one particular scene to another).

In response to the request for the pixel data transmission representative of the particular scene, the virtual reality media provider system may identify pixel data included within the virtual reality world data and representative of a set of pixels that constitute the particular scene. The virtual reality media provider system may provide a minimized pixel data transmission representative of the particular scene to the media player device by way of the network. For example, it may be determined that pixel data representative of parts of the immersive virtual reality world outside of a particular scene of the immersive virtual reality world (e.g., a scene being looked at by the user) may not need to be rendered. Moreover, even some of the pixel data within the particular scene may correspond to regions of a display screen being used by the user that may be unviewable to the user or may be perceived by the user at a lower level of detail (e.g., perceived by the peripheral vision of the user) as the user experiences the particular scene.

Accordingly, the virtual reality media provider system may provide the minimized pixel data transmission representative of the particular scene by transmitting a viewable pixel data subset included in the pixel data and representative of pixels that correspond to one or more regions of the head-mounted display screen that are predetermined to be viewable by the user while the user experiences the immersive virtual reality world, while abstaining from transmitting an unviewable pixel data subset included in the pixel data and representative of pixels that correspond to one or more regions of the head-mounted display screen that are predetermined to be unviewable by the user while the user experiences the immersive virtual reality world.

The immersive virtual reality world may be fully immersive in the sense that the user may not be presented with any image of the real world in which the user is located while the user is experiencing the immersive virtual reality world, in contrast to certain "augmented reality" technologies. However, while real-world scenery directly surrounding the user may not be presented together with the immersive virtual reality world, the immersive virtual reality world may, in certain examples, be generated based on data (e.g., image and/or audio data) representative of camera-captured real-world scenery rather than animated or computer-generated scenery of imaginary worlds such as those commonly generated for video games, animated entertainment programs, and so forth. For example, as will be described in more detail below, camera-captured real-world scenery may include real-world places (e.g., city streets, buildings, landscapes, etc.), real-world events (e.g., sporting events, large celebrations such as New Year's Eve or Mardi Gras, etc.), fictionalized live action entertainment (e.g., virtual reality television shows, virtual reality movies, etc.), and so forth.

A user using the media player device may experience the immersive virtual reality world by way of a field of view that shows a particular scene within the immersive virtual reality world (e.g., images depicting scenery and objects surrounding the user within the immersive virtual reality world) that may dynamically change based on natural input received from the user as the user experiences the immersive virtual reality world. For example, the media player device may detect user input (e.g., head movements of the user that shift a position, orientation, etc. of the head-mounted display screen upon which the field of view is presented) that represents a request to receive a pixel data transmission representative of a different particular scene (e.g., scenery and/or objects in a different area) of the immersive virtual reality world. In this way, the field of view may essentially provide the user a "window" through which the user can easily and naturally look around the immersive virtual reality world.

Several benefits arise by minimizing pixel data transmission in a network-based virtual reality media delivery configuration in this way. For example, by minimizing pixel data transmission by abstaining to transmit pixel data representative of pixels that correspond to one or more regions of the head-mounted display screen that are predetermined to be unviewable by the user while the user experiences the immersive virtual reality world, a backend server associated with the virtual reality media provider system may have a lower processing burden than if the server were to continuously transmit pixel data representative of the entire immersive virtual reality world or even the entire particular scene that the user is experiencing. This alleviated processing burden in the server may result in decreased costs of maintaining a virtual reality media backend server and/or in increased output of the backend server for the virtual reality media provider associated with the backend server. As such, the backend server may be able to provide better service and/or may be able to serve more users.

Similarly, by receiving minimized pixel data transmissions from a virtual reality media provider system, a media player device may have significantly less processing to perform in order to receive and/or filter unused data. As a result, the media player device may show increased responsiveness, better battery life, and/or other benefits.

The minimized pixel data transmissions may also benefit the network over which the virtual reality media content may be distributed by using less of the network's finite bandwidth. Along with using fewer network resources and allowing for more data to be communicated over the network, the reduced network usage may additionally result in direct cost savings for the user, who may be charged based on how much data he or she causes to be sent over the network. For example, the user may save money and enjoy more network usage without paying excessive fees for the network usage.

Moreover, all of these benefits may be available with little or no noticeable effect on the virtual reality experience for the user. For example, as will be described in more detail below, the virtual reality media provider system may detect certain network conditions between the virtual reality media provider system and the media player device (e.g., a current network latency to send and/or receive data, etc.) to determine if the network conditions are suitable for the minimized pixel data transmissions to be performed. When network conditions are detected to be unsuitable (e.g., if the network latency is high enough that the user would experience an unresponsive lag in moving between particular scenes while experiencing the immersive virtual reality world), the virtual reality media provider system may automatically begin sending more pixel data (e.g., non-minimized pixel data transmissions) to ensure that the user enjoys a smooth and responsive virtual reality experience. As such, the methods and systems for minimizing pixel data transmission in a network-based virtual reality media delivery configuration described herein may significantly lower the costs of the virtual reality experience to both the user and the virtual reality media provider with little or no effect on the immersiveness of the virtual reality world to the user experiencing the immersive virtual reality world.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary configuration 100 in which exemplary embodiments of a 360-degree camera, a virtual reality media backend server, and one or more media player devices operate to facilitate minimizing pixel data transmission in a network-based virtual reality media delivery configuration. As shown in FIG. 1, a 360-degree camera 102 ("camera 102") may capture and/or generate a 360-degree image of real-world scenery 104 around a center point corresponding to camera 102. For example, camera 102 may capture a plurality of images from each of a plurality of segment capture cameras 106 built into or otherwise associated with camera 102, and may generate the 360-degree image of real-world scenery 104 by combining the plurality of images captured by segment-capture cameras 106.

Camera 102 may capture data representative of 360-degree images of real-world scenery 104 and transmit the data to a virtual reality media backend server 108 ("backend server 108") by way of a network 110. After preparing and/or processing the data representative of the 360-degree images to generate an immersive virtual reality world based on the 360-degree images, backend server 108 may transmit data representative of the immersive virtual reality world to one or more media player devices 112 (e.g., media player devices 112-1 through 112-n), and users 114 (e.g., users 114-1 through 114-n) may experience the immersive virtual reality world by way of media player devices 112. Each of the elements of configuration 100 will now be described in detail.

Camera 102 may be set up and/or operated by a virtual reality content creator and may include any type of camera that is configured to capture data representative of a 360-degree image of real-world scenery 104 around a center point corresponding to camera 102. As used herein, a 360-degree image is any still or video image that depicts the surroundings (e.g., real-world scenery 104) of a center point (e.g., a center point associated with the location of camera 102) on all sides along at least one dimension. For example, one type of 360-degree image may include a panoramic image that depicts a complete 360-degree by 45-degree ring around a center point corresponding to a camera (e.g., camera 102). Another type of 360-degree image may include a spherical image that depicts not only the ring around the center point, but an entire 360-degree by 180-degree sphere surrounding the center point on all sides. In certain examples, a 360-degree image may be based on a non-circular geometric structure. For example, certain 360-degree images may be based on cubes, rectangular prisms, pyramids, and/or other geometric structures that may serve a particular implementation, rather than being based on spheres.

Camera 102 may be configured to capture the data representative of the 360-degree image of real-world scenery 104 in any way that may serve a particular implementation. For example, as shown in FIG. 1, camera 102 may capture various segments of real-world scenery 104 using segment capture cameras 106, which may each capture an image of a single segment of real-world scenery 104 that may be combined (e.g., stitched together) with other segments to generate the 360-degree image of real-world scenery 104. In certain examples, segment capture cameras 106 may each represent a single camera unit (e.g., including a lens and suitable image capture hardware) built into a single 360-degree camera configured to capture 360-degree images. In other examples, camera 102 may include an array of segment capture cameras 106 that are each a single, standalone camera configured to capture standard images (e.g., images depicting less than a 360-degree view) that may later be combined to form the 360-degree image. In yet other examples, camera 102 may include one or more "fish-eye" lenses configured to capture a very wide-angle image (e.g., a spherical image or a semi-spherical image) that can be used as the 360-degree image or processed to generate the 360-degree image. Alternatively, camera 102 may include a single, standard camera that captures and/or combines a plurality of still images of real-world scenery 104 taken at different points in time (e.g., using a "panorama mode" of the camera or a similar feature) to capture still 360-degree images. In certain examples, camera 102 may include one or more stereoscopic cameras. Camera 102 may also use any combination of the 360-degree image capture techniques described above or any other capture techniques that may serve a particular implementation.

Subsequent to capturing raw image data representative of real-world scenery 104, camera 102 may generate from the raw image data a 360-degree image of real-world scenery 104. For example, camera 102 may be configured to automatically process the raw image data (e.g., by combining a plurality of images captured by segment capture cameras 106, by processing images captured by a fish-eye lens, etc.) to form the 360-degree image, and then may transmit data representative of the 360-degree image to backend server 108. Alternatively, camera 102 may be configured to transmit the raw image data directly to backend server 108, and any processing and/or combining of the raw image data may be performed within backend server 108.

Camera 102 may capture any real-world scenery 104 that may serve a particular embodiment. For example, real-world scenery 104 may include any indoor or outdoor real-world location such as the streets of a city, a museum, a scenic landscape, a satellite orbiting and looking down upon the Earth, the surface of another planet, or the like. Real-world scenery 104 may further include certain events such as a stock car race, a football game or other sporting event, a large-scale party such as New Year's Eve on Times Square in New York City, or other events that may interest potential users. In certain examples, real-world scenery 104 may be a setting for a fictionalized event, such as a set of a live-action virtual reality television show or movie.

In some implementations, capturing real-world scenery 104 using camera 102 may be optional. For example, a 360-degree image of scenery surrounding a center point may be completely computer-generated (e.g., animated) based on models of an imaginary world rather than captured from real-world scenery 104 by camera 102. As such, camera 102 may be omitted in certain examples.

Backend server 108 may comprise a server or other computing device associated with (e.g., provided and/or managed by) a virtual reality media service provider (e.g., a network service provider, a cable service provider, a satellite service provider, an Internet service provider, a provider of virtual reality mobile applications, etc.) and may be configured to provide virtual reality media content to users (e.g., subscribers of a virtual reality media content service, users who download or otherwise acquire virtual reality mobile applications, etc.) by way of media player devices 112. To this end, backend server 108 may receive, generate, process, and/or maintain data representative of virtual reality media content. For example, backend server 108 may be configured to receive camera-captured data (e.g., video data captured by camera 102) representative of a 360-degree image of real-world scenery 104 around a center point corresponding to camera 102. If the camera-captured data is raw image data (e.g., image data captured by each of segment capture cameras 106 that has not been combined into a 360-image), backend server 108 may unwrap, combine (i.e., stitch together), or otherwise process the raw image data to form the 360-degree image representative of real-world scenery 104.

Based on the camera-captured data representative of real-world scenery 104 (e.g., the 360-degree image), backend server 108 may generate and maintain virtual reality world data representative of an immersive virtual reality world that may be experienced by a user. For example, backend server 108 may generate a three-dimensional ("3D") model of the immersive virtual reality world where virtual objects may be presented along with projections of real-world scenery 104 to a user experiencing the immersive virtual reality world. To generate the immersive virtual reality world, backend server 108 may perform video transcoding, slicing, orchestration, modeling, and/or any other processing that may serve a particular embodiment.

Subsequent to or concurrent with generating one or more immersive virtual reality worlds associated with one or more virtual reality media content instances (also referred to herein as "virtual reality media content programs"), backend server 108 may provide access to the virtual reality media content programs for users such as subscribers of a virtual reality media content service operated by the virtual reality media provider and/or users who download or otherwise acquire virtual reality mobile applications provided by the virtual reality media provider. To this end, backend server 108 may provide, responsive to user input from users of media player devices 112, pixel data representative of sets of pixels that constitute particular scenes of the immersive virtual reality world to be rendered by media player devices 112. For example, as will be described in more detail below, backend server 108 may provide a minimized pixel data transmission representative of a particular scene.

More specifically, providing a minimized pixel data transmission may include transmitting a viewable pixel data subset included in the pixel data and representative of pixels that correspond to one or more regions of a head-mounted display screen of one of media player devices 112 that are predetermined to be viewable by the user while the user experiences the immersive virtual reality world. Additionally, providing the minimized pixel data transmission may include abstaining from transmitting an unviewable pixel data subset included in the pixel data and representative of pixels that correspond to one or more regions of the head-mounted display screen that are predetermined to be unviewable by the user while the user experiences the immersive virtual reality world. Examples of viewable pixel data subsets and unviewable pixel data subsets will be described in more detail below.

Camera 102, backend server 108, and media player devices 112 may communicate with one another using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Network 110 may include any provider-specific network (e.g., a cable or satellite carrier network or a mobile telephone network), the Internet, wide area network, or any other suitable network. Data may flow between camera 102, backend server 108, and media player devices 112 by way of network 110 using any communication technologies, devices, media, and protocols as may serve a particular implementation. While only one network 110 is shown to interconnect camera 102, backend server 108, and media player devices 112 in FIG. 1, it will be recognized that these devices and systems may intercommunicate by way of multiple interconnected networks as may serve a particular implementation.

Media player devices 112 may be used by users 114 to access and experience virtual reality media content received from backend server 108. To this end, media player devices 112 may each include or be implemented by any device capable of presenting a field of view of an immersive virtual reality world and detecting user input from a user (e.g. one of users 114) to dynamically change the particular scene displayed within the field of view as the user experiences the immersive virtual reality world. For example, media player devices 112 may include or be implemented by a head-mounted virtual reality device (e.g., a virtual reality gaming device) that includes a head-mounted display screen, a personal computer device (e.g., a desktop computer, laptop computer, etc.), a mobile or wireless device (e.g., a smartphone, a tablet device, a mobile reader, etc.), or any other device or configuration of devices that may serve a particular implementation to facilitate receiving and/or presenting virtual reality media content. Different types of media player devices 112 (e.g., head-mounted virtual reality devices, personal computer devices, mobile devices, etc.) may provide different types of virtual reality experiences having different levels of immersiveness for users 114. Additionally, as will be made apparent below, methods and systems for minimizing pixel data transmission described herein may be particularly optimized for certain types (e.g., form factors) of media player devices 112, such as media player devices 112 that include head-mounted display screens (e.g., tethered or untethered media player devices employing head-mounted virtual reality devices (i.e., virtual reality headsets), mobile devices mounted to the head of the user by an apparatus such as a cardboard apparatus, etc.).

Media player devices 112 may be configured to allow users 114 to select respective virtual reality media content programs that users 114 may wish to experience on their respective media player devices 112. In certain examples, media player devices 112 may download virtual reality media content programs that users 114 may experience offline (e.g., without an active connection to backend server 108). In other examples, media player devices 112 may request and receive data streams representative of virtual reality media content programs that users 114 experience while media player devices 112 remain in active communication with backend server 108 by way of network 110.

To facilitate users 114 in experiencing virtual reality media content, each of media player devices 112 may include or be associated with at least one display screen (e.g., a head-mounted display screen built into a head-mounted virtual reality device or a display screen of a mobile device mounted to the head of the user with an apparatus such as a cardboard apparatus) upon which particular scenes of an immersive virtual reality world may be displayed. Media player devices 112 may also include software configured to receive, maintain, and/or process data representative of the immersive virtual reality world to present the particular scenes of the immersive virtual reality world on the display screens of the media player devices. For example, media player devices 112 may include dedicated, standalone software applications (e.g., mobile applications) configured to process and present data representative of immersive virtual reality worlds on the displays. In other examples, the software used to present the particular scenes of the immersive virtual reality worlds may include non-dedicated software such as standard web browser applications.

Figure 2:
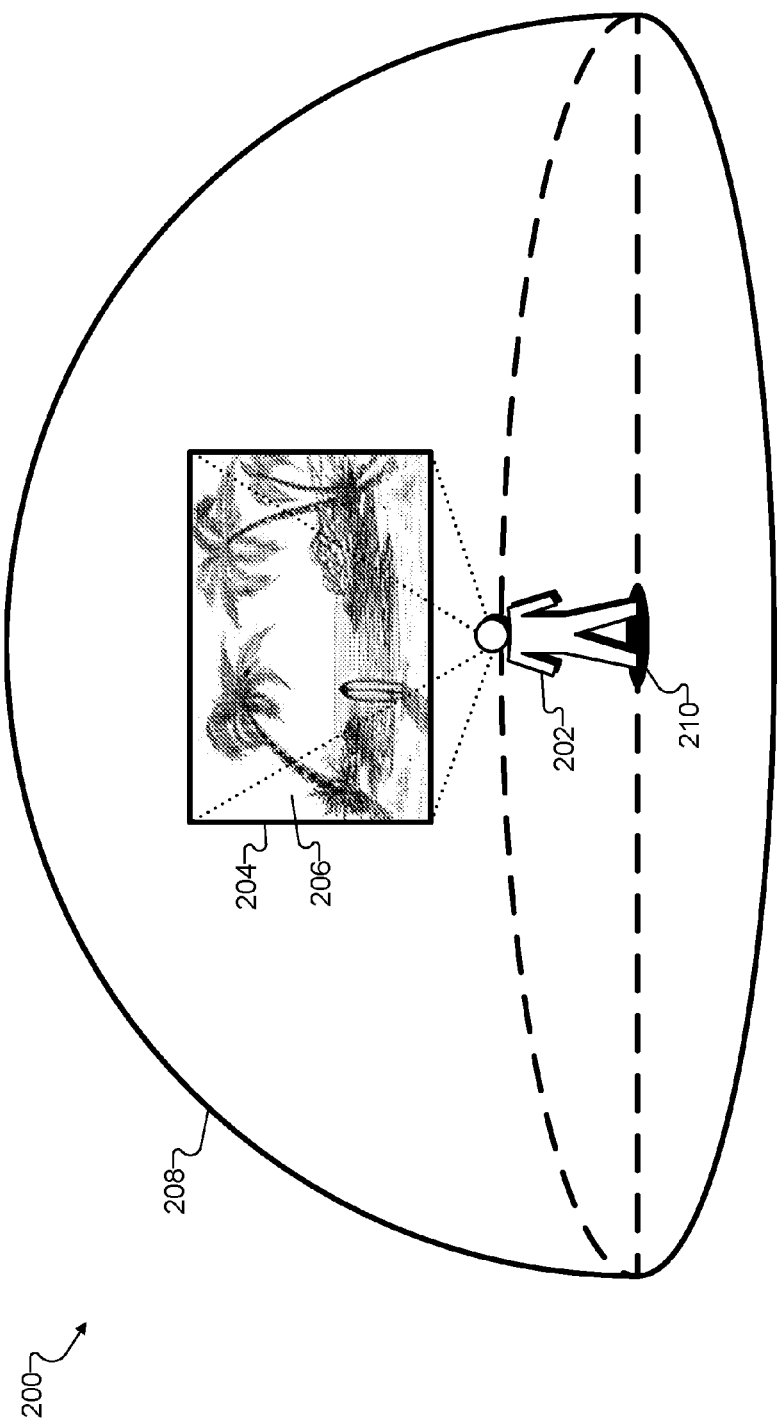
FIG. 2 illustrates an exemplary virtual reality experience in which a user is presented with a particular scene within an exemplary immersive virtual reality world according to principles described herein.

FIG. 2 illustrates an exemplary virtual reality experience 200 in which a user 202 is presented with an exemplary field of view 204 that displays a particular scene 206 of an exemplary immersive virtual reality world 208. User 202 may experience immersive virtual reality world 208 ("world 208") by providing user input to dynamically change field of view 204 to display whatever particular scene within world 208 (e.g., particular area or part of world 208) that user 202 wishes to view. For example, the user input provided by user 202 may include motions (e.g., head motions) by which user 202 looks around world 208 at other scenes within world 208 other than particular scene 206. More specifically, for media player devices 112 incorporating particular sensors (e.g., motion, directional, and/or orientation sensors) such as a mobile device or a head-mounted virtual reality device with a head-mounted display screen, the user input may include a change to an orientation of the display screen of the media player device 112 with respect to at least one axis of at least two orthogonal axes.

For example, the media player device may be configured to sense changes in orientation of the display screen with respect to an x-axis, a y-axis, and a z-axis that are all orthogonal to one another. As such, the media player device 112 may be configured to detect the change to the orientation of the display screen as user 202 experiences world 208, and in response, may transmit a request to receive a pixel data transmission of a particular scene of world 208 that is determined to be visible from a viewpoint of user 202 within world 208 according to the detected change to the orientation of the display screen with respect to the at least one axis. For example, the request to receive the pixel data transmission may include or may take the form of motion data representative of head motions of user 202 detected by the motion, directional, and/or orientation sensors. For other types of media player devices 112 (e.g., a personal computer and/or a mobile device, this user input may include a mouse movement, navigation key input from a keyboard, a swipe gesture, or the like.

To illustrate, FIG. 2 shows that particular scene 206 may include real-world scenery depicting a beach with palm trees and a surfboard. User 202 may provide user input to a media player device by which user 202 is experiencing world 208 (e.g., one of media player devices 112) to indicate that user 202 wishes to look to the left of particular scene 206 currently displayed within field of view 204. For example, user 202 may change the orientation of the display screen with respect to a y-axis by rotating his or her head to the left while wearing a head-mounted virtual reality device with a head-mounted display screen. In response, the real-world scenery (i.e., the palm trees, the surfboard, etc.) may scroll to the right across field of view 204 to give user 202 a sensation that he or she is turning to look to the left in world 208. As particular scene 206 scrolls off the right side of field of view 204, a new particular scene (not explicitly shown in FIG. 2) smoothly scrolls onto the left side of field of view 204. In this way, user 202 may provide user input to cause field of view 204 to present any particular scene or part of world 208 that user 202 desires.

In FIG. 2, world 208 is illustrated as a semi-sphere, indicating that user 202 may look in any direction that is substantially forward, backward, left, right, and/or up. However, if user 202 directs field of view 204 down, world 208 may not include dynamic and/or real-world scenery to be presented within field of view 204. For example, if world 208 includes a dynamic immersive virtual reality world (i.e., using a 360-degree video image), field of view 204 may present a still image representative of the ground of world 208. In other examples, field of view 204 may present nothing (i.e., a black screen), a menu, one or more virtual objects, or any other suitable image that may serve a particular implementation. In other examples, world 208 may include an entire 360-degree by 180-degree sphere so that every direction in which user 202 may direct field of view 204 is associated with dynamic and/or real-world scenery of world 208.

As shown in FIG. 2, world 208 may appear to surround a center point 210 associated with user 202. In some embodiments, center point 210 may correspond to a location of a camera (e.g., camera 102) used to capture the real-world scenery of world 208 (e.g., including particular scene 206). As such, center point 210 may be static or may move through world 208 in a way that user 202 is unable to control (e.g. moving through world 208 in a same manner as camera 102 moved through real-world scenery 104 during the creation of the virtual reality media content). In other embodiments, user 202 may be able to provide input to modify where center point 210 is located within world 208. For example, user 202 may hop from one center point to another (e.g., corresponding to where each of a plurality of 360-degree cameras captured 360-degree images) within world 208 or cause center point 210 to move continuously within world 208. While center point 210 is illustrated at the feet of user 202 for simplicity of illustration, it will be understood that center point 210 may actually be located at the eye level of user 202.

As mentioned above, different types (i.e., form factors) of media player devices 112 may provide different experiences for user 202 by presenting field of view 204 of world 208 in different ways, by receiving user input from user 202 in different ways, and so forth. As further mentioned, the methods and systems for minimizing pixel data transmission described herein may be particularly well-optimized for a media player device configured to be mounted on the user's head in front of the user's eyes (e.g., a mobile device) or that otherwise includes a head-mounted virtual reality device (e.g., headset) with a head-mounted display screen.

Figure 3:
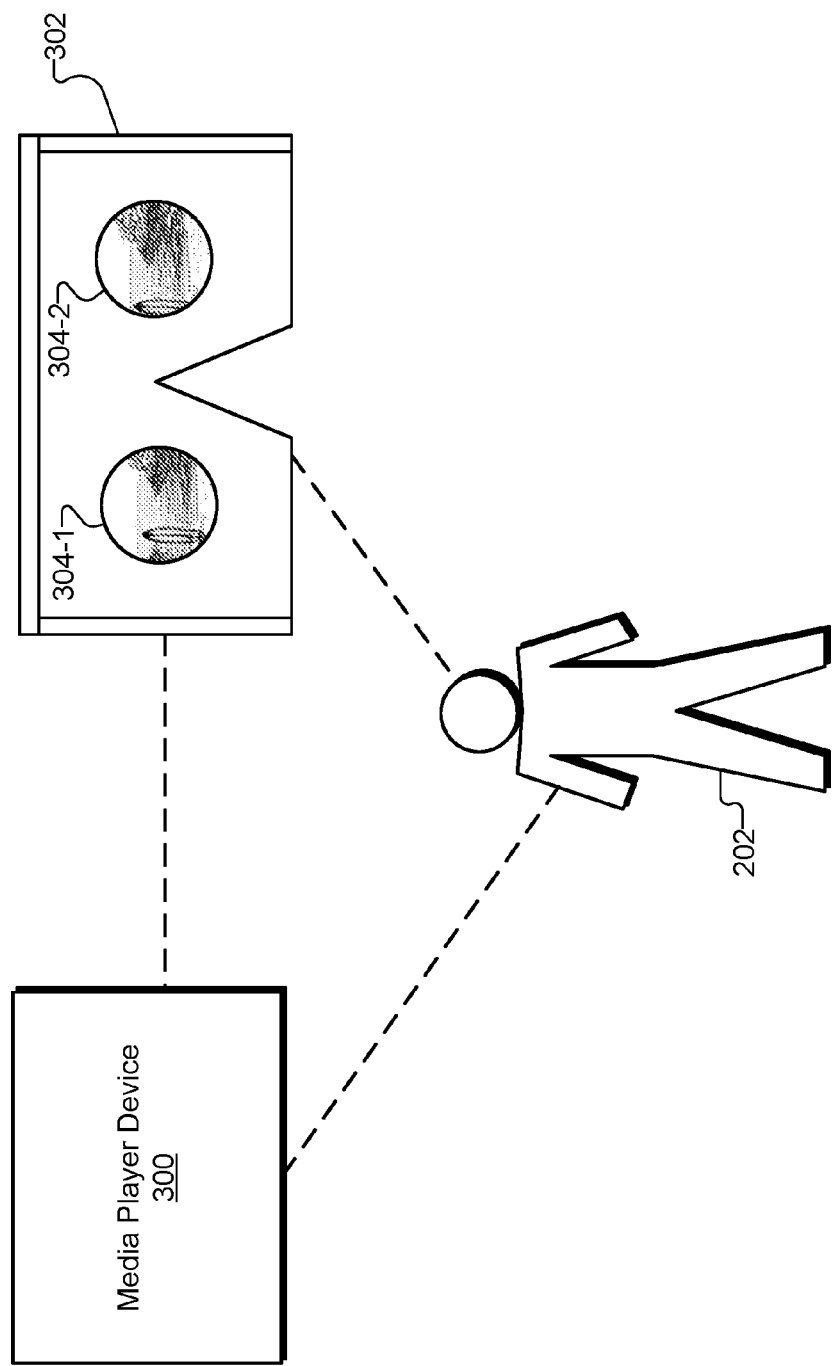
FIG. 3 illustrates an exemplary media player device including an exemplary head-mounted virtual reality device with a head-mounted display screen configured to facilitate experiencing the immersive virtual reality world of FIG. 2 by a user according to principles described herein.

To illustrate, FIG. 3 shows an exemplary media player device 300 including an exemplary head-mounted virtual reality device 302 with at least one head-mounted display screen 304 (e.g., display screens 304-1 and 304-2) configured to facilitate experiencing the world 208 by user 202. Media player device 300 may be similar or the same as other media player devices described herein (e.g., media player devices 112) and may be associated with (e.g., include) a head-mounted display screen as illustrated by display screens 304. In some examples, media player device 300 may include a tethered device configuration where head-mounted virtual reality device 302 with head-mounted display screens 304 are separate from and communicatively coupled with one or more processing modules and/or other components of media player device 300. In other examples, media player device 300 may include an all-in-one device configuration where all of the processing, sensors, display screens, and other parts of media player device 300 are built together into head-mounted virtual reality device 302.

As shown, head-mounted virtual reality device 302 may be mounted on the head of user 202 and arranged so that each of the eyes of user 202 sees a distinct display screen 304 (i.e., display screen 304-1 and 304-2) or a distinct portion 304-1 and 304-2 of a single display screen 304 that is split to include the distinct portions within head-mounted virtual reality device 302. In some examples, a single display screen 304 that is not split to include distinct portions 304-1 and 304-2 may be presented and shared by both eyes of user 202.

In certain examples, as shown, display screens 304 (or display screen portions 304) within head-mounted virtual reality device 302 may be configured to display slightly different versions of field of view 204 (e.g., stereoscopic versions of field of view 204 that may be captured by one or more stereoscopic cameras) to give user 202 the sense that world 208 is three-dimensional. Display screens 304 may also be configured to display particular scene 206 such that particular scene 206 fills the peripheral vision of user 202, providing even more of a sense of realism to user 202. Moreover, head-mounted virtual reality device 302 may include motion sensors (e.g., accelerometers), directional sensors (e.g., magnetometers), orientation sensors (e.g., gyroscopes), and/or other suitable sensors to detect natural movements (e.g., head movements) of user 202 as user 202 experiences world 208. Thus, user 202 may provide input indicative of a desire to move field of view 204 in a certain direction and by a certain amount in world 208 by simply turning his or her head in that direction and by that amount. As such, media player device 300 may provide user 202 with a natural and hands-free experience that does not require any physical console control to experience the immersive virtual reality world.

As another example of a media player device, a mobile device having a display screen may be used by user 202 to experience world 208. Mobile devices may be extremely ubiquitous, potentially providing access to many more people than dedicated head-mounted virtual reality devices. However, because many mobile devices are equipped with motion sensors, directional sensors, orientation sensors, etc., mobile devices may also be configured to provide user 202 with an immersive experience comparable to that provided by dedicated media player devices that include head-mounted virtual reality devices. For example, a mobile device may be configured to divide a display screen of the mobile device into two versions (e.g., stereoscopic versions) of field of view 204 and to present particular scene 206 to fill the peripheral vision of user 202 when the mobile device is mounted to the head of user 202 using a relatively inexpensive and commercially-available mounting apparatus (e.g., a cardboard apparatus having a lens for each eye of user 202).

While examples of certain media player devices have been described, the examples are illustrative and not limiting. A media player device may include any suitable device and/or configuration of devices configured to facilitate receipt and presentation of virtual reality media content according to principles described herein. As another example, a head-mounted virtual reality media player device or other media player device may be used in conjunction with a virtual reality controller such as a wearable controller (e.g., a ring controller) and/or a handheld controller.

Figure 4:
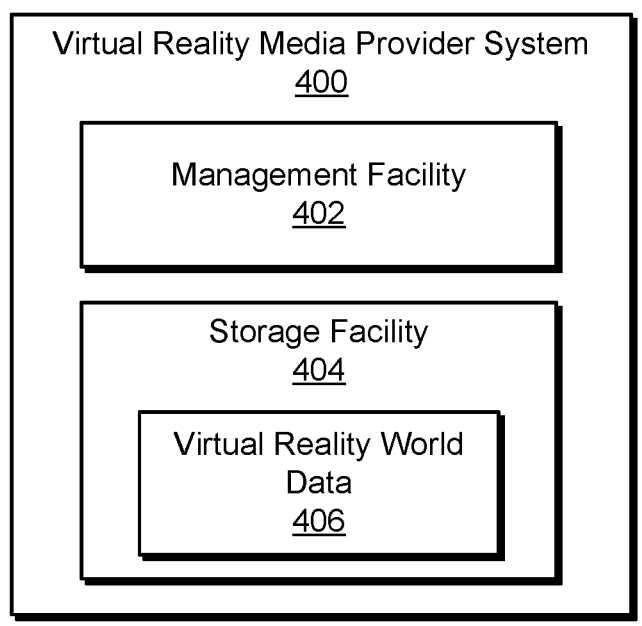
FIG. 4 illustrates an exemplary virtual reality media provider system that may be used in accordance with methods and systems for minimizing pixel data transmission in a network-based virtual reality media delivery configuration according to principles described herein.

FIG. 4 illustrates an exemplary virtual reality media provider system 400 ("system 400") configured to minimize pixel data transmission in a network-based virtual reality media delivery configuration. As shown, system 400 may include, without limitation, a management facility 402 and a storage facility 404 selectively and communicatively coupled to one another. It will be recognized that although facilities 402 and 404 are shown to be separate facilities in FIG. 4, facilities 402 and 404 may be combined into fewer facilities, such as into a single facility, or divided into more facilities as may serve a particular implementation.

System 400 may be implemented by or may include one or more devices and/or systems described above in relation to FIG. 1. For example, system 400 may be implemented entirely by backend server 108. In certain embodiments, camera 102, components of network 110, components of media player devices 112, and/or one or more other computing devices (e.g., servers) may also serve to implement at least certain components and/or operations of system 400. As will be described in more detail below, system 400 may manage (e.g., receive, maintain, pass through, etc.), and/or provide (e.g., transmit) virtual reality world data to media player devices such as media player device 300, described above in relation to FIG. 3.

Storage facility 404 may maintain virtual reality world data 406 received, generated, managed, maintained, used, and/or transmitted by management facility 402. Virtual reality world data 406 may include pixel data representative of particular scenes within world 208 (e.g., data representative of one or more 360-degree images that include particular scene 206 shown in FIG. 2), data representative of one or more virtual objects that may be presented within world 208, data used to identify pixel data representative of a set of pixels that constitute a particular scene, data used to identify viewable pixel data subsets representative of pixels that correspond to one or more regions of a head-mounted display screen (e.g., head-mounted display screens 304) that are predetermined to be viewable by user 202 while user 202 experiences the immersive virtual reality world, data used to identify unviewable pixel data subsets representative of pixels that correspond to one or more regions of a head-mounted display screen (e.g., head-mounted display screens 304) that are predetermined to be unviewable by user 202 while user 202 experiences the immersive virtual reality world, motion data received from media player device 300, data used to track the location of field of view 204, data used to present and/or render a particular scene to be presented within field of view 204, and/or any other data that may serve a particular implementation.

Management facility 402 may perform any suitable operations for minimizing pixel data transmission in a network-based virtual reality media delivery configuration between system 400 and one or more media player devices (e.g., media player device 300). For example, as will be described in more detail below, management facility 402 may receive a request from media player device 300 for media player device 300 to receive a pixel data transmission representative of a particular scene of an immersive virtual reality world, identify pixel data included within virtual reality world data 406 and representative of a set of pixels that constitute the particular scene, and provide to media player device 300 by way of a network a minimized pixel data transmission representative of the particular scene. Exemplary operations that may be performed by system 400 (i.e., management facility 402) will be described below.

To illustrate how system 400 may facilitate minimizing pixel data transmission in a network-based virtual reality media delivery configuration, various examples will now be provided. In particular, the examples below illustrate an exemplary network-based virtual reality media delivery configuration (see FIG. 5), an exemplary head-mounted display screen displaying an exemplary set of pixels that constitute a particular scene of an immersive virtual reality world (see FIG. 6), an exemplary viewable pixel subset and an exemplary unviewable pixel subset (see FIG. 7), an exemplary gaze pixel subset and an exemplary peripheral pixel subset (see FIG. 8), exemplary patterned pixel subsets (see FIG. 9), and exemplary pixel interpolation techniques (see FIG. 10).

Figure 5:
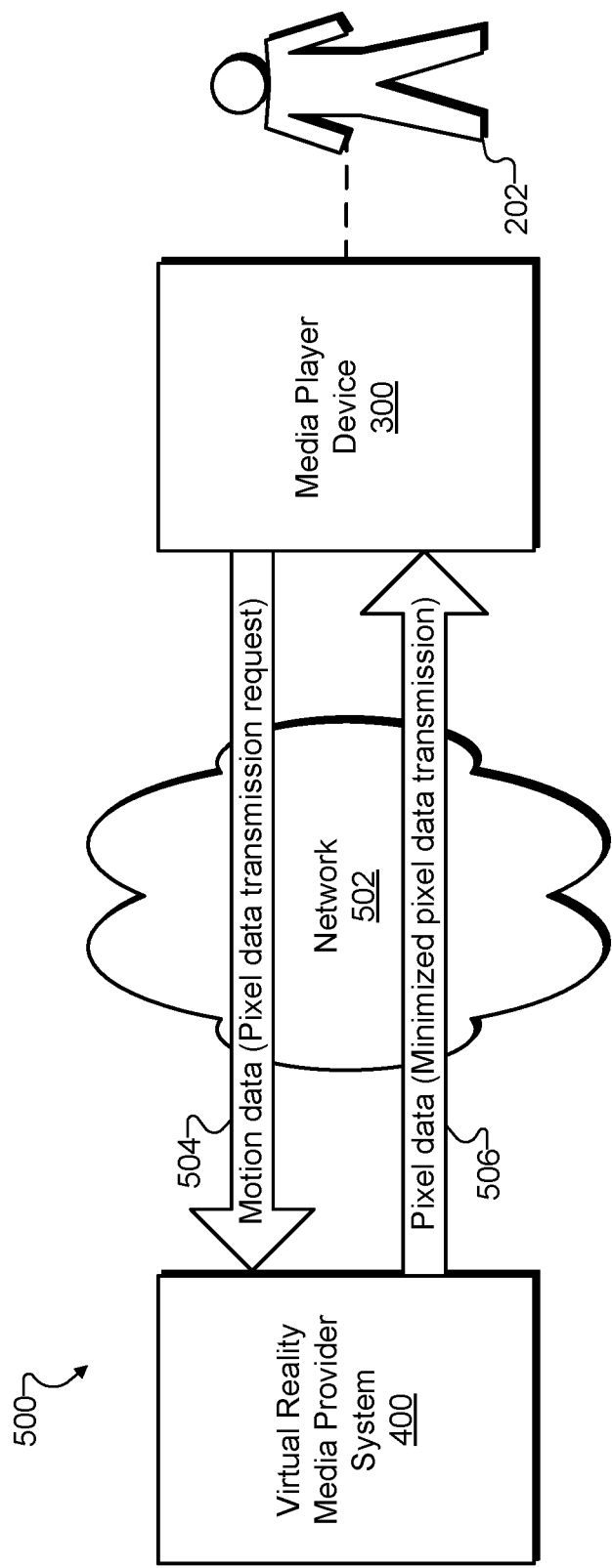
FIG. 5 illustrates an exemplary network-based virtual reality media delivery configuration of the media player device of FIG. 3 and the virtual reality media provider system of FIG. 4 according to principles described herein.

FIG. 5 illustrates an exemplary network-based virtual reality media delivery configuration 500 of media player device 300 and system 400. Specifically, as shown in configuration 500, media player device 300 is being used by user 202 (e.g., to experience an immersive virtual reality world such as world 208, described above in FIG. 2) and is communicatively coupled to system 400 via a network 502. Network 502 may be the same or similar to network 110, described above in relation to FIG. 1.

Because, as mentioned above, system 400 may manage virtual reality world data 406 within storage facility 404, system 400 may receive, by way of network 502, a request 504 from media player device 300 for media player device 300 to receive a pixel data transmission representative of a particular scene of an immersive virtual reality world represented by virtual reality world data 406. Request 504 may take any form that may serve a particular implementation. For example, request 504 may include parameters (e.g., positional coordinates) precisely defining an area of the immersive virtual reality world where the particular scene desired by user 202 is occurring. Additionally or alternatively, request 504 may include motion data (e.g., head motion data) such as an indication that user 202 turned his or her head to the left a certain number of degrees and up a certain number of degrees from the previous head position sent. In other examples, request 504 may include other data indicative of user input that media player device 300 has received from user 202 and/or a particular scene (e.g., area of the immersive virtual reality world) user 202 has most recently indicated that he or she would like to view as may serve a particular implementation.

In response to receiving request 504, system 400 may identify pixel data (e.g., included within virtual reality world data 406) that represents of a set of pixels that constitute the particular scene requested in request 504. Additionally, in certain examples, system 400 may use data received from media player device 300 (e.g., motion data associated with request 504 and/or other data received from media player device 300 over network 502) and/or other data stored within storage facility 404 to predict a particular scene that user 202 will request in the future (e.g., a few seconds into the future) and to begin identifying pixel data that represents a second set of pixels that constitute the one or more additional scene that are predicted to soon be requested. In some examples, the particular scenes may overlap (e.g., if user 202 gradually moves his or her head within the immersive virtual reality world) such that one particular scene may share most of the pixel data included in a previous particular scene. As such, system 400 may incrementally load pixel data corresponding to portions of the immersive virtual reality world in a direction that user 202 is predicted to look.

System 400 may predict where user 202 will look next in any way that may serve a particular embodiment. For example, predictions may be based on motion data received from media player device 300 (e.g., by predicting that user 202 will continue turning his or her head in a direction his or her head is currently turning). Additionally or alternatively, predictions may be based on events occurring (or known by system 400 to be imminent) within the immersive virtual reality world (e.g., an object likely to draw the attention of user 202 will appear or a sound likely to draw attention will be made). In certain implementations, system 400 may include heuristic data for a particular virtual reality media program that indicates, with respect to the passage of time within the virtual reality media program, what particular scenes previous users to experience the immersive virtual reality world associated with the virtual reality media program have directed attention to. Accordingly, such heuristic data may be used in conjunction with or instead of other types of data described above to predict a particular scene user 202 is likely to request in the future.

Once system 400 identifies the pixel data representative of the set of pixels constituting the particular scene requested in request 504 (e.g., including by predicting the particular scene in advance), system 400 may provide a minimized pixel data transmission 506 representative of the particular scene to media player device 300 over network 502. Minimized pixel data transmission 506 may include any pixel data that may serve a particular embodiment. For example, if network conditions (e.g., network latency, speed, etc.) permit, minimized pixel data transmission 506 may include a viewable subset of the set of pixels that constitute the particular scene while not including an unviewable subset of the set of pixels. Specifically, system 400 may transmit a viewable pixel data subset included in the pixel data and representative of pixels that correspond to one or more regions of the head-mounted display screen that are predetermined to be viewable by the user while the user experiences the immersive virtual reality world, and abstain from transmitting an unviewable pixel data subset included in the pixel data and representative of pixels that correspond to one or more regions of the head-mounted display screen that are predetermined to be unviewable by the user while the user experiences the immersive virtual reality world. Examples of viewable pixels and unviewable pixels associated with the viewable pixel data subset and the unviewable pixel data subset will described and illustrated below.

As mentioned above, transmitting minimized pixel data transmission 506 may improve the efficiency of system 400, media player device 300, and network 502 as long as network conditions such as network latency between system 400 and media player device 300 are such that media player device 300 receives requested pixel data in a timely fashion without undue lag. If proper network conditions such as network latency are not met, however, it may be desirable for system 400 to transmit more pixel data to media player device 300 (e.g., up to and including pixel data representative of an entirety of the immersive virtual reality world) so that media player device 300 will have pixel data needed to display a requested particular scene for user 202 responsively and without undesirable lag as user 202 experiences the immersive virtual reality world.

To this end, system 400 may detect a network condition (e.g., network latency, network throughput, etc.) associated with a connection between system 400 and media player device 300 by way of network 502 prior to the providing of minimized pixel data transmission 506. Then, based on the detected network condition (e.g., if the network latency is below a predetermined threshold, if the network throughput is above a predetermined threshold, etc.), system 400 may provide minimized pixel data transmission 506 as described above.

Similarly, in the same or other examples, system 400 may detect the network condition associated with the connection between system 400 and media player device 300 by way of network 502 concurrent with (e.g., at the same time as) the transmitting of minimized pixel data transmissions representative of the particular scene (e.g., after minimized pixel data transmission 506 and/or other minimized pixel data transmissions have begun to be transmitted or have been transmitted). As long as the network condition meets one or more predetermined thresholds (e.g., network latency below a predetermined threshold, network throughput above a predetermined threshold, etc.), system 400 may continue transmitting minimized pixel data transmissions based on requests received from media player device 300. However, if the network condition fails to meet the one or more predetermined thresholds, system 400 may cease abstaining from transmitting the unviewable pixel data subset. In other words, based on the detecting of the network condition, system 400 may begin transmitting the unviewable pixel data subset and possibly other pixel data (e.g., up to an including pixel data representative of an entirety of the immersive virtual reality world) along with the viewable data pixel subset until the network condition again meets the predetermined thresholds such that minimized pixel data transmission 506 may be transmitted without risk of user 202 experiencing a non-responsive or lagging immersive virtual reality world.

Figure 6:
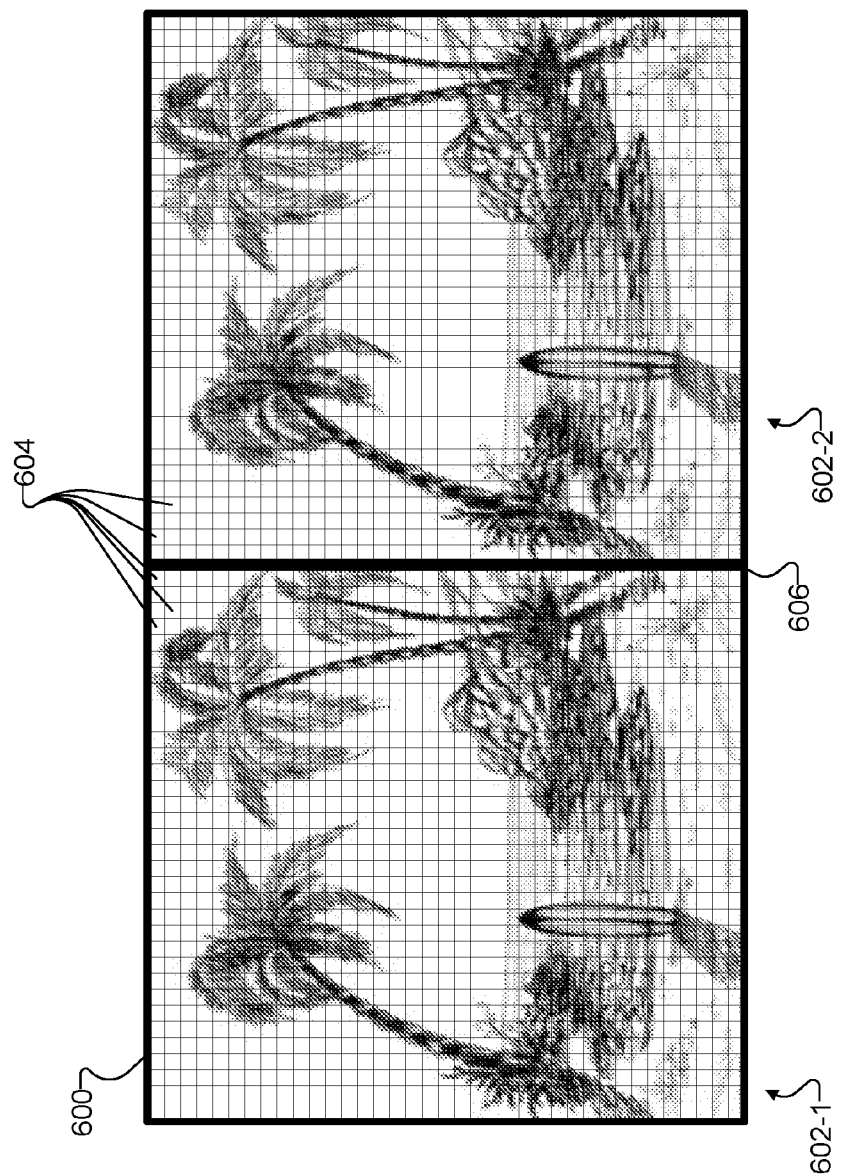
FIG. 6 illustrates an exemplary head-mounted display screen displaying an exemplary set of pixels that constitute a particular scene of an immersive virtual reality world according to principles described herein.

FIG. 6 illustrates an exemplary head-mounted display screen displaying an exemplary set of pixels that constitute a particular scene of an immersive virtual reality world. More specifically, a head-mounted display screen 600 may be divided into two portions 602-1 and 602-2 that may each include a set of pixels 604. As illustrated by a dividing line 606, portions 602-1 and 602-2 of display screen 600 may be divided approximately in half such that portions 602-1 and 602-2 each display pixels 604 that constitute the same particular scene (e.g., particular scene 206 as described above in relation to FIG. 2) or stereoscopic versions of the same particular scene. Dividing line 606 may actually be represented on display screen 600 by one or more rows of pixels as shown, may not actually be represented on display screen 600, or may represent a division between two separate display screens in embodiments where there are separate display screens dedicated to each eye of user 202 rather than a single shared display screen such as illustrated by display screen 600. It is noted that for illustrative purposes, pixels 604 are not drawn to scale with display screen 600 and/or with the representation of the particular scene shown. In certain embodiments more or fewer pixels 604 may be included on display screen 600 and/or each of pixels 604 may be representative of a plurality of pixels.

Figure 7:
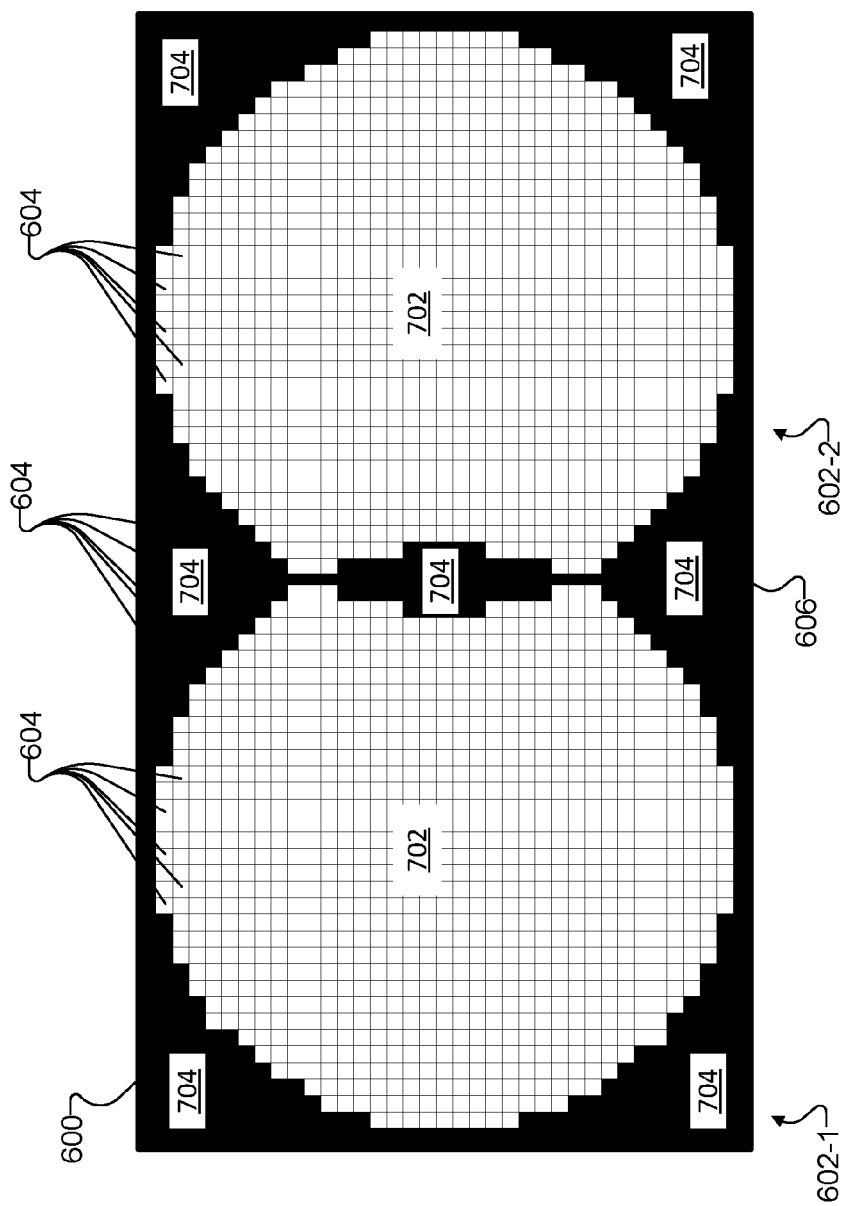
FIG. 7 illustrates the exemplary head-mounted display screen of FIG. 6 with a distinction between a viewable pixel subset included in the set of pixels and an unviewable pixel subset included in the set of pixels according to principles described herein.

FIG. 7 illustrates display screen 600 with a distinction between a viewable pixel subset 702 included in the set of pixels 604 and an unviewable pixel subset 704 included in the set of pixels 604. As mentioned above, system 400 may provide minimized pixel data transmission 506 to media player device 300 by transmitting a viewable pixel data subset that corresponds to one or more regions of a head-mounted display screen that are predetermined to be viewable by user 202 while user 202 experiences the immersive virtual reality world. Viewable pixel subset 702 illustrates pixels that correspond to this viewable pixel data subset for display screen 600. Specifically, as shown by viewable pixel subset 702 (i.e., the white pixels within display screen 600), the one or more regions of display screen 600 that are predetermined to be viewable by the user may include non-overlapping portions of two overlapping shapes (e.g., rounded or circular shapes) arranged on display screen 600. In particular, due to a configuration of lenses within a head-mounted virtual reality device that includes display screen 600, a relative size of display screen 600, a distance from display screen 600 to the lenses and/or from the lenses to the eyes of user 202 when user 202 is wearing display screen 600, and/or one or more other factors, it may be predetermined that user 202 will only be able to view viewable pixel subset 702 when properly wearing display screen 600. Other pixels 604 not included within viewable pixel subset 702 may be impossible or difficult for the user to view.

In certain examples, the one or more regions of display screen 600 that are predetermined to be viewable by the user may include a first set of regions defined by a predetermined mask. For example, the predetermined mask may be determined based on a characteristic of display screen 600, a user profile associated with the user, pixel data representative of the set of pixels that constitute the particular scene, and/or with any other factor as may serve a particular implementation. As such, the predetermined mask may be used to designate the pixels illustrated in viewable pixel subset 702 as viewable by the user regardless of which pixels may or may not actually be viewable to any particular usable.

Similarly, unviewable pixel subset 704 may illustrate pixels that correspond to the unviewable pixel data subset for display screen 600. Specifically, as shown by unviewable pixel subset 704 (i.e., the black pixels within display screen 600), the one or more regions of display screen 600 that are predetermined to be unviewable by the user may include overlapping portions of the two overlapping shapes (i.e. such as illustrated by the narrow region in the middle of display screen 600) as well as regions of display screen 600 bordering an outer boundary of display screen 600 and exterior to the two overlapping shapes (i.e., such as illustrated by the corner regions and the central top and bottom regions of display screen 600). In particular, due to a configuration of display screen 600 in relation to lenses and to the eyes of user 202 as described above, it may be predetermined that it will be impossible or difficult for the user to view unviewable pixel subset 704 when properly wearing display screen 600.

In certain examples, the one or more regions of display screen 600 that are predetermined to be unviewable by the user may include a second set of regions defined by the predetermined mask described above (e.g., a different set of regions than those defined for the first set of regions described above). As described above, the predetermined mask may be determined based on a characteristic of display screen 600, a user profile associated with the user, pixel data representative of the set of pixels that constitute the particular scene, and/or with any other factor as may serve a particular implementation. Thus, the predetermined mask may be used to designate the pixels illustrated in unviewable pixel subset 704 as unviewable by the user regardless of which pixels may or may not actually be viewable to any particular usable.

As shown in FIG. 7, the overlapping shapes may be circular. However, in certain embodiments, other shapes may be used as may serve a particular embodiment. For example, certain implementations may employ a barrel distortion to the pixel data represented by pixels 604 to offset or compensate for distortion that is anticipated to be caused by doubly convex lenses in a head-mounted virtual reality device housing display screen 600. As such, the shapes may be a barrel shape (i.e., similar to a square or rectangle whose edges are "bulging" outwards) or any other shape that may serve a particular embodiment.

Additionally, in certain examples (not explicitly shown in FIG. 7), there may be one or more additional regions (e.g., regions around the outside of the shapes, near the edge of display screen 600) that are predetermined to be unviewable by user 202 while user 202 experiences the immersive virtual reality world, but which may correspond to an additional pixel data subset that is nonetheless transmitted along with pixel data corresponding to viewable pixel subset 702 (i.e., rather than being abstained from being transmitted along with pixel data corresponding to unviewable pixel subset 704). For example, the additional pixel data subset may help provide media player device 300 with sufficient pixel data to display a requested particular scene with minimal or no delay when user 202 begins to shift the field of view to a new particular scene of the immersive virtual reality world and while media player device 300 requests additional pixel data and waits to receive the additional pixel data from system 400.

Figure 8:
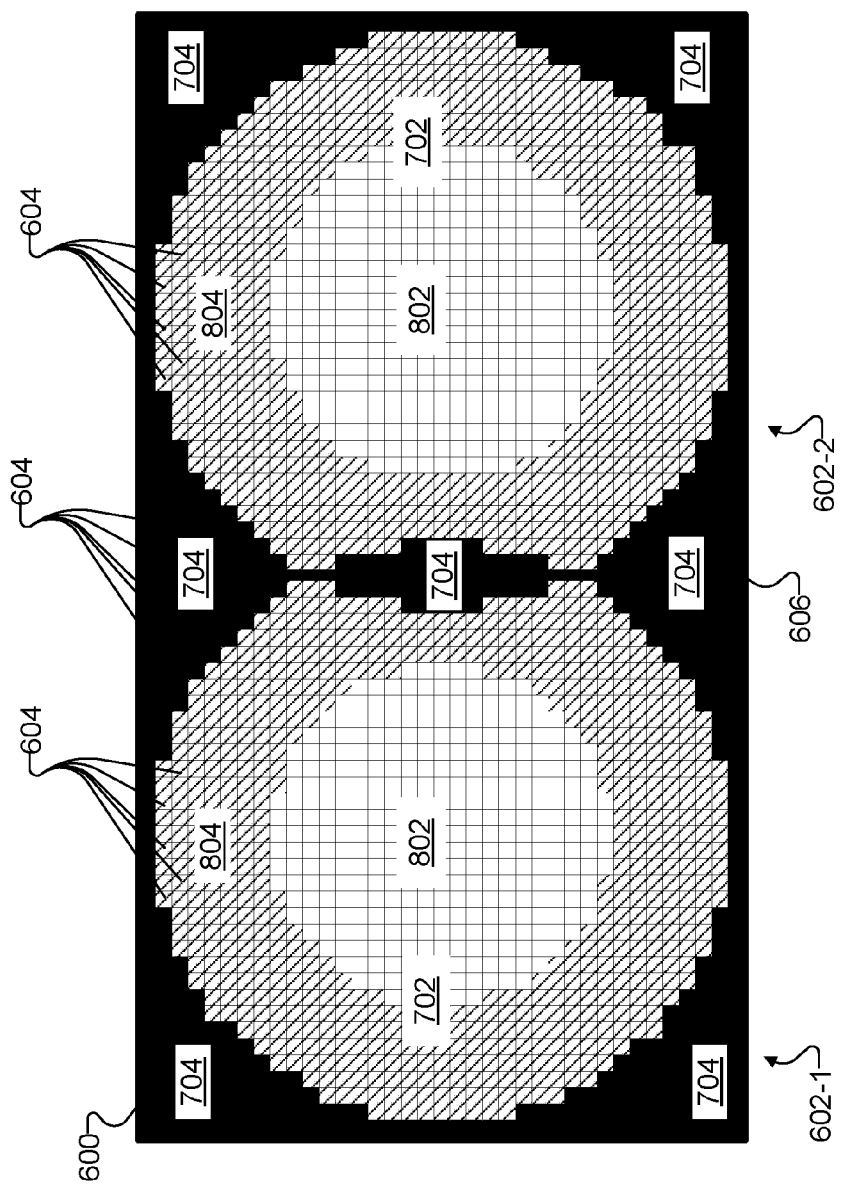
FIG. 8 illustrates the exemplary head-mounted display screen of FIG. 6 with a distinction between a gaze pixel subset and a peripheral pixel subset within the viewable pixel subset of FIG. 7 and the unviewable pixel subset of FIG. 7 according to principles described herein.

FIG. 8 illustrates display screen 600 with a distinction between a gaze pixel subset 802 and a peripheral pixel subset 804 within viewable pixel subset 702, along with unviewable pixel subset 704, as described above in relation to FIG. 7. In addition to (or in place of) minimizing pixel data transmission by transmitting a viewable pixel data subset (i.e., pixel data corresponding to viewable pixel subset 702) and abstaining from transmitting an unviewable pixel data subset (i.e., pixel data corresponding to unviewable pixel subset 704), system 400 may perform additional or alternative operations to further minimize (e.g., reduce) pixel data transmission to media player device 300.

For example, system 400 may identify (e.g., in response to receiving request 504 from media player device 300) a gaze region of display screen 600 that is located within the one or more regions of display screen 600 that are predetermined to be viewable by user 202 while user 202 experiences the immersive virtual reality world (e.g., corresponding to viewable pixel subset 702) and that is associated with a direct gaze of user 202. System 400 may identify the gaze region in any way that serves a particular embodiment. For example, system 400 may designate one or more static regions (e.g., circular static regions located directly in front of the eyes of user 202 when user 202 is wearing display screen 600) as the gaze region. In other examples, system 400 may receive eye tracking data representative of eye movements of user 202 as user 202 experiences the immersive virtual reality world from media player device 300 by way of network 502 (e.g., as part of request 504). System 400 may then identify the gaze region dynamically based on the received eye tracking data representative of the eye movements of the user. In certain examples, identifying the gaze region based on the eye tracking data may be more accurate (i.e., more true to where the gaze of the user is actually directed) than by designating static regions.

Similarly, system 400 may further identify (e.g., in response to receiving request 504 from media player device 300) a peripheral region of display screen 600 that is also located within the one or more regions of display screen 600 that are predetermined to be viewable by user 202 (e.g., corresponding to viewable pixel subset 702) and that is associated with a peripheral vision of user 202 such that user 202 perceives a higher level of detail within the gaze region than within the peripheral region. As with the gaze region discussed above, system 400 may identify the peripheral region by designating predetermined static regions of display screen 600 (e.g., annular regions surrounding the gaze region), by using eye tracking data to dynamically (and, in some examples, more accurately) identify the peripheral region, and/or by any other technique that may serve a particular embodiment.

In FIG. 8, gaze pixel subset 802 may illustrate pixels that correspond to a gaze region identified by system 400 for display screen 600. Specifically, as shown by gaze pixel subset 802 (i.e., the white pixels within display screen 600), static areas directly in front of the eyes of user 202 when user 202 wears display screen 600 may be identified (e.g., designated) by system 400 as the gaze region. Similarly, peripheral pixel subset 804 may illustrate pixels that correspond to a peripheral region for display screen 600. Specifically, as shown by peripheral pixel subset 804, (i.e. the partially shaded pixels within display screen 600), annular static areas surrounding gaze pixel subset 802 may be identified (e.g., designated) by system 400 as the gaze region.

Once system 400 identifies the gaze region and the peripheral region, system 400 may transmit a minimized pixel data transmission by identifying a gaze pixel data subset including pixels corresponding to the gaze region (i.e., pixel data corresponding to gaze pixel subset 802), identifying a peripheral pixel data subset including pixels corresponding to the peripheral region (i.e., pixel data corresponding to peripheral pixel subset 804), converting the peripheral pixel data subset from a high resolution to a low resolution (e.g., a resolution lower than the high resolution), transmitting the gaze pixel data subset at the high resolution, and transmitting the peripheral pixel data subset at the low resolution. As described above, system 400 may, in some examples, still abstain from transmitting the unviewable pixel data subset corresponding to unviewable pixel subset 704.

Because data transmitted at the low resolution may include less detail (i.e., corresponding to less data) than data transmitted at the high resolution, system 400 may minimize the pixel data transmission even further using operations described in relation to FIG. 8, as compared to the operations described in relation to FIG. 7 (e.g., where all of viewable pixel data subset 702 may be transmitted at the high resolution). However, because the pixel data transmitted at the low resolution (i.e., pixel data corresponding to peripheral pixel subset 804) may only be seen by user 202 in the peripheral vision of user 202, where user 202 may perceive a lower level of detail as compared to his or her perception of images under his or her direct gaze, user 202 may not perceive, notice, or be bothered or distracted by the lower quality of the image presented in the peripheral region.

Applying a similar technique, in certain examples, system 400 may identify a plurality of peripheral regions (e.g., regions in concentric circles going outward from the gaze region) associated with pixel data that may be transmitted at increasingly lower resolutions to minimize pixel data transmission even further. For example, the plurality of peripheral regions may be transmitted at increasingly lower resolutions as they go outward (i.e., getting farther from the gaze region) until reaching the one or more regions of display screen 600 that are predetermined to be unviewable (i.e., the regions of display screen 600 corresponding to unviewable pixel subset 704), for which no pixel data may be transmitted.

Figure 9:
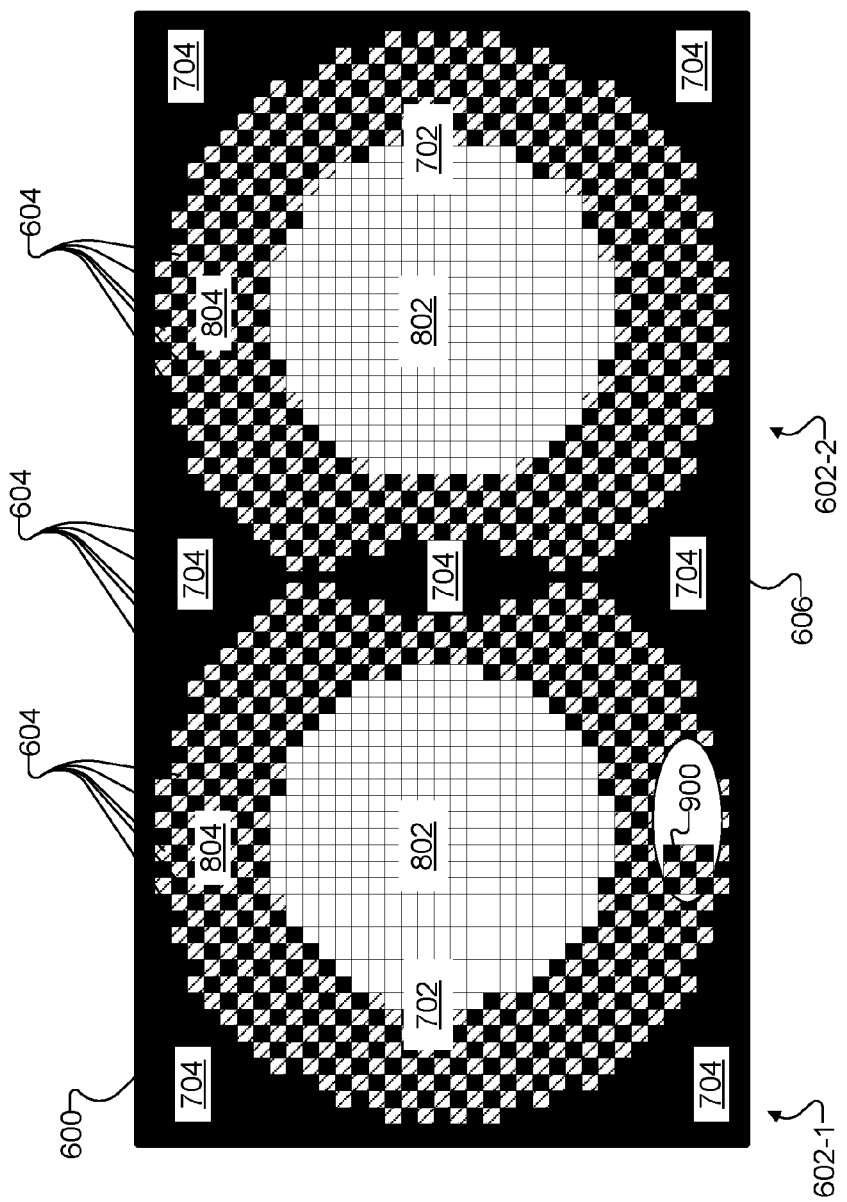
FIG. 9 illustrates the exemplary head-mounted display screen of FIG. 6 with a first patterned pixel subset and a second patterned pixel subset within the peripheral pixel subset of FIG. 8 according to principles described herein.

FIG. 9 illustrates display screen 600 with a first patterned pixel subset and a second patterned pixel subset within peripheral pixel subset 804, as described above in relation to FIG. 8. FIG. 9 illustrates yet another technique for minimizing pixel data transmission. Specifically, system 400 may identify the gaze region and the peripheral region of display screen 600 as described above in relation to FIG. 8, for example by designating static regions as the gaze region and the peripheral region and/or by receiving eye tracking data and identifying the gaze region and the peripheral region based on the eye tracking data.

Once system 400 identifies the gaze region and the peripheral region, system 400 may transmit a minimized pixel data transmission by identifying a gaze pixel data subset including pixels corresponding to the gaze region (i.e., pixel data corresponding to gaze pixel subset 802), identifying a first patterned pixel data subset including pixels corresponding to a first pattern of pixels within the peripheral region (i.e., pixel data corresponding to a first checkered pattern of pixels within peripheral pixel subset 804), identifying a second patterned pixel data subset including pixels corresponding to a second pattern of pixels within the peripheral region (e.g., pixel data corresponding to a second checkered pattern of pixels within peripheral pixel subset 804 that is complementary to the first checkered pattern of pixels), transmitting the gaze pixel data subset, transmitting the first patterned pixel data subset, and abstaining from transmitting the second patterned pixel data subset. As described above, system 400 may still abstain from transmitting the unviewable pixel data subset corresponding to unviewable pixel subset 704.

The first pattern of pixels within the peripheral region and the second pattern of pixels complementary to the first pattern of pixels within the peripheral region may include any complementary patterns that may serve a particular implementation. For example, FIG. 9 illustrates a first patterned pixel subset (i.e., partially shaded pixels within peripheral pixel subset 804) that is in a checkered pattern. Specifically, as shown, all the partially shaded pixels within peripheral pixel subset 804 other than those bordered by either gaze pixel subset 802 or unviewable pixel subset 704 touch other partially shaded pixels on each corner but are not directly adjacent to any other partially shaded pixel. To complement this first pattern of pixels of the first patterned pixel subset, the second patterned pixel subset (i.e., black pixels within peripheral pixel subset 804) is in a similar checkered pattern of pixels that complements the first pattern of pixels.

In other examples, the first pattern of pixels may include horizontal stripes of pixels, vertical stripes of pixels, diagonal stripes of pixels, zigzag patterns of pixels, individual pixels or groupings of pixels (e.g., shapes) distributed randomly or in a pattern, and/or any other pattern that may serve a particular implementation. As such, the second pattern of pixels may include any suitable features such that the second pattern of pixels complements the first pattern of pixels (i.e., by including pixels not included within the first pattern of pixels).

By transmitting only the first patterned pixel subset within peripheral pixel subset 804 while abstaining from transmitting the second patterned pixel subset within peripheral pixel subset 804, system 400 may further minimize (i.e., further reduce the size of) the pixel data transmission, as compared to the operations described in relation to FIG. 7 (e.g., where all of viewable pixel subset 702 may be transmitted at the high resolution) and/or FIG. 8 (e.g., where all of viewable pixel subset 702 is transmitted as mixed resolutions).

It will be understood that each of the techniques for minimizing pixel data transmission presented consecutively in FIGS. 6-8 (i.e., abstaining from transmitting pixel data corresponding to unviewable regions, transmitting pixel data corresponding to peripheral regions at a reduced resolution, and abstaining from transmitting all of the pixel data corresponding to peripheral regions, respectively) may be used independently (i.e., one at a time) or in any combination as may serve a particular embodiment. For example, FIG. 7 illustrates just one technique being performed, FIG. 8 illustrates two techniques being performed, and FIG. 9 illustrates a combination of all three techniques being performed. In other examples, other combinations not explicitly described herein may similarly be performed. For example, system 400 may transmit pixel data corresponding to peripheral regions at one or more reduced resolutions as described in relation to FIG. 8 and/or abstain from transmitting all of the pixel data corresponding to peripheral regions as described in relation to FIG. 9 while, for instance, not abstaining from transmitting pixel data corresponding to unviewable regions as described in relation to FIG. 7.

Even though system 400 may abstain from transmitting the second patterned pixel subset (i.e., the black checkered pattern shown in peripheral pixel subset 804 in FIG. 9) to media player device 300, the pixels corresponding to peripheral pixel subset 804 may only be seen by user 202 in the peripheral vision of user 202, where user 202 may perceive a lower level of detail as compared to his or her perception of images under his or her direct gaze. Thus, as described above, user 202 may not perceive, notice, or be bothered or distracted by the lower quality of the image presented in the peripheral region. This is particularly true when media player device 300 is configured to interpolate pixel values (e.g., using anti-aliasing techniques) for the pixels that system 400 abstains from transmitting.

For example, pixel block 900 shows a grouping of pixels large enough to show both a portion of both the first patterned pixel subset and the second patterned pixel subset. While, in FIG. 9, the first and second patterns of pixels appear to be checkered pixel by pixel, it will be understood that other checkered patterns may be used. For example, each of pixels 604 illustrated in FIG. 9 may actually represent a two-by-two grouping of pixels such that the first and second patterns of pixels may be checkered in two-by-two pixel groupings.

Figure 10:
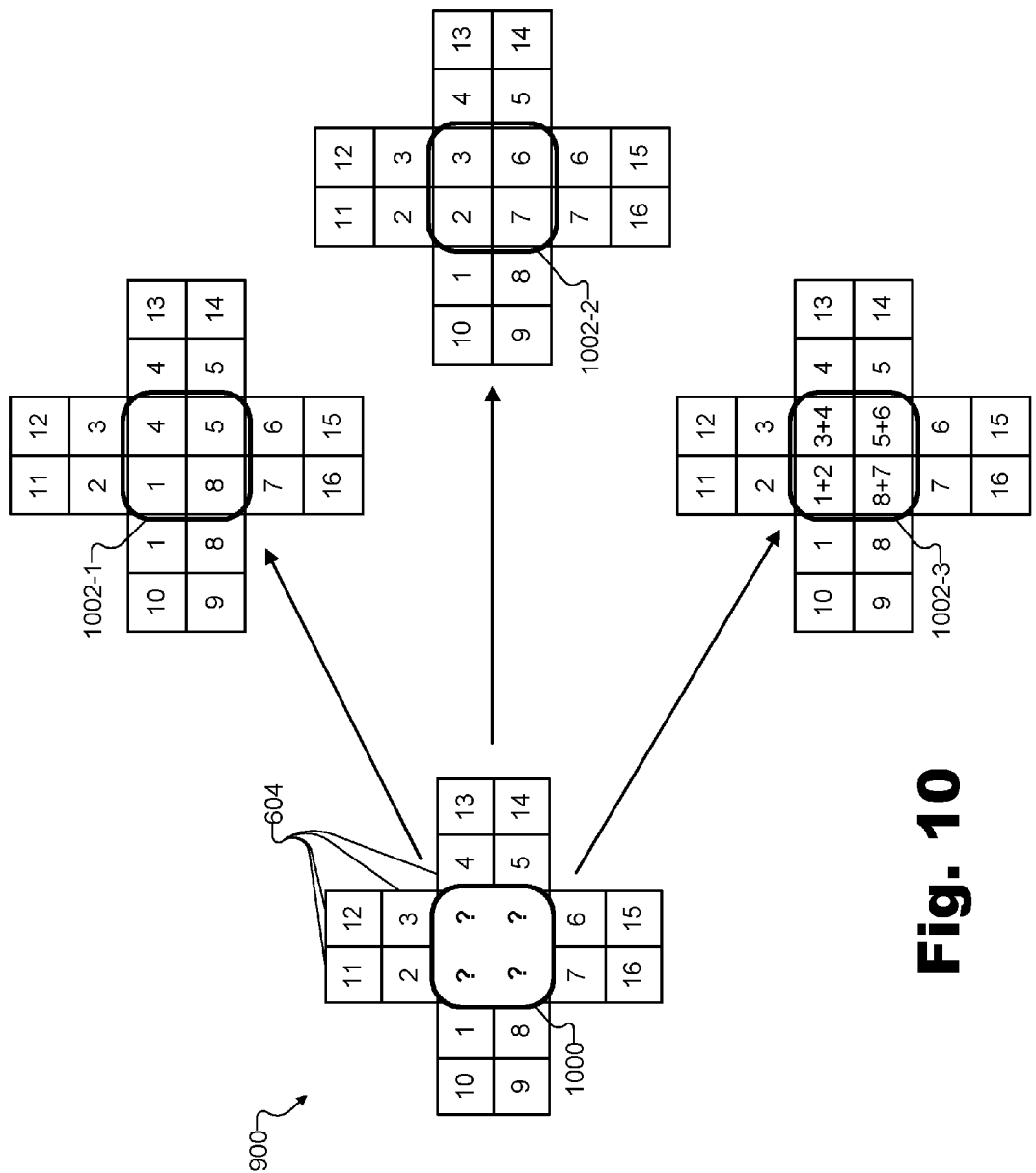
FIG. 10 illustrates exemplary pixel interpolation techniques that may be performed to replace the second patterned pixel subset of FIG. 9 according to principles described herein.

To illustrate, FIG. 10 shows pixel block 900 as pixel block 900 may be received by media player device 300 from system 400 (e.g., in minimized pixel data transmission 506). Specifically, as shown in FIG. 10, pixel block 900 may include two-by-two groupings of pixels 604 in a first checkered pattern with empty spots (e.g., a two-by-two empty grouping 1000) in a second, complementary checkered pattern. FIG. 10 illustrates exemplary pixel interpolation techniques that may be performed to replace (e.g., to fill in) empty grouping 1000 and the other empty spots arising from the fact that system 400 abstained from transmitting the second patterned pixel subset of FIG. 9 to minimize the pixel data transmission.

As shown on the left in FIG. 10, each of pixels 604 within pixel block 900 may be associated with a particular pixel value (e.g., pixel data representative of a color, brightness, etc., for that particular pixel 604). For example, starting on the inside left and going around clockwise, pixels 604 of pixel block 900 are labeled with arbitrary numbers 1 through 16 to represent pixel values for each respective pixel 604. Question marks are shown corresponding to each pixel that will be interpolated by media player device 300 in empty grouping 1000.

To the right, three different possibilities for interpolating the pixels of empty grouping 1000 are illustrated in interpolated groupings 1002 (e.g., interpolated groupings 1002-1 through 1002-3). Specifically, interpolated grouping 1002-1 illustrates a simple pixel interpolation technique wherein each pixel is assumed to have the value of the nearest neighboring pixel in a horizontal direction. Thus, the pixel on the top left of interpolated grouping 1002-1 is interpolated to be a 1 like the nearest neighboring pixel to the left, the pixel on the top right is interpolated to be a 4 like the nearest neighboring pixel to the right, the pixel on the bottom left is interpolated to be an 8 like the nearest neighboring pixel to the left, and the pixel on the bottom right is interpolated to be a 5 like the nearest neighboring pixel to the right.

Interpolated grouping 1002-2 illustrates a similar pixel interpolation technique wherein each pixel is assumed to have the value of the nearest neighboring pixel in a vertical direction. Thus, the pixel on the top left of interpolated grouping 1002-2 is interpolated to be a 2 like the nearest neighboring pixel above it, the pixel on the top right is interpolated to be a 3 like the nearest neighboring pixel above it, the pixel on the bottom left is interpolated to be a 7 like the nearest neighboring pixel below it, and the pixel on the bottom right is interpolated to be a 6 like the nearest neighboring pixel below it.

Interpolated grouping 1002-3 illustrates a slightly more complex pixel interpolation technique that combines the techniques illustrated by interpolated groupings 1002-1 and 1002-2, wherein each pixel is assigned an average of the value of the nearest neighboring pixel in the horizontal direction and of the value of the nearest neighboring pixel in the vertical direction. Thus, the pixel on the top left of interpolated grouping 1002-3 is interpolated to be an average of 1 (the nearest neighboring pixel to the left) and 2 (the nearest neighboring pixel above), and is illustrated using a notation "1+2" to represent the average of the pixel values (i.e., a color, brightness, etc., between the color and brightness of pixel value 1 and pixel value 2). Similarly, the pixel on the top right is interpolated to be an average of 4 (the nearest neighboring pixel to the right) and 5 (the nearest neighboring pixel above), the pixel on the bottom left is interpolated to be an average of 8 (the nearest neighboring pixel to the left) and 7 (the nearest neighboring pixel below), and the pixel on the bottom right is interpolated to be an average of 5 (the nearest neighboring pixel to the right) and 6 (the nearest neighboring pixel below). The techniques illustrated in FIG. 10 are exemplary only. In other examples, other pixel interpolation techniques (e.g., anti-aliasing techniques) may be used as may serve a particular embodiment.

Significant and quantitatively measurable system improvements (e.g., related to lower processing burdens, enhanced processing speed, optimized memory and/or transmission bandwidth usage, etc.) may result from minimizing pixel data transmissions using methods and systems described herein. For example, minimizing a pixel data transmission by abstaining from transmitting an unviewable pixel data subset representative of pixels that correspond to one or more regions of a head-mounted display screen that are predetermined to be unviewable by the user while the user experiences the immersive virtual reality world may reduce the pixel data transmitted by approximately 20%-25% (e.g., depending on the design of the head-mounted display screen and/or the shapes of the one or more regions the system abstains from transmitting). Similarly, transmitting the peripheral pixel data subset at a low resolution may reduce the pixel data associated with the peripheral pixel data subset by approximately 50% (e.g., assuming the low resolution is half the quality of the high resolution), and abstaining from transmitting the second patterned pixel data subset may further reduce the pixel data associated with the peripheral pixel data subset by approximately 50% more (e.g., assuming a checkered pattern such as illustrated in FIG. 9). Accordingly, total transmission bandwidth savings of approximately 30%-40% or even more may be realizable if all of the methods for minimizing pixel data transmission described herein are combined together.

Figure 11:
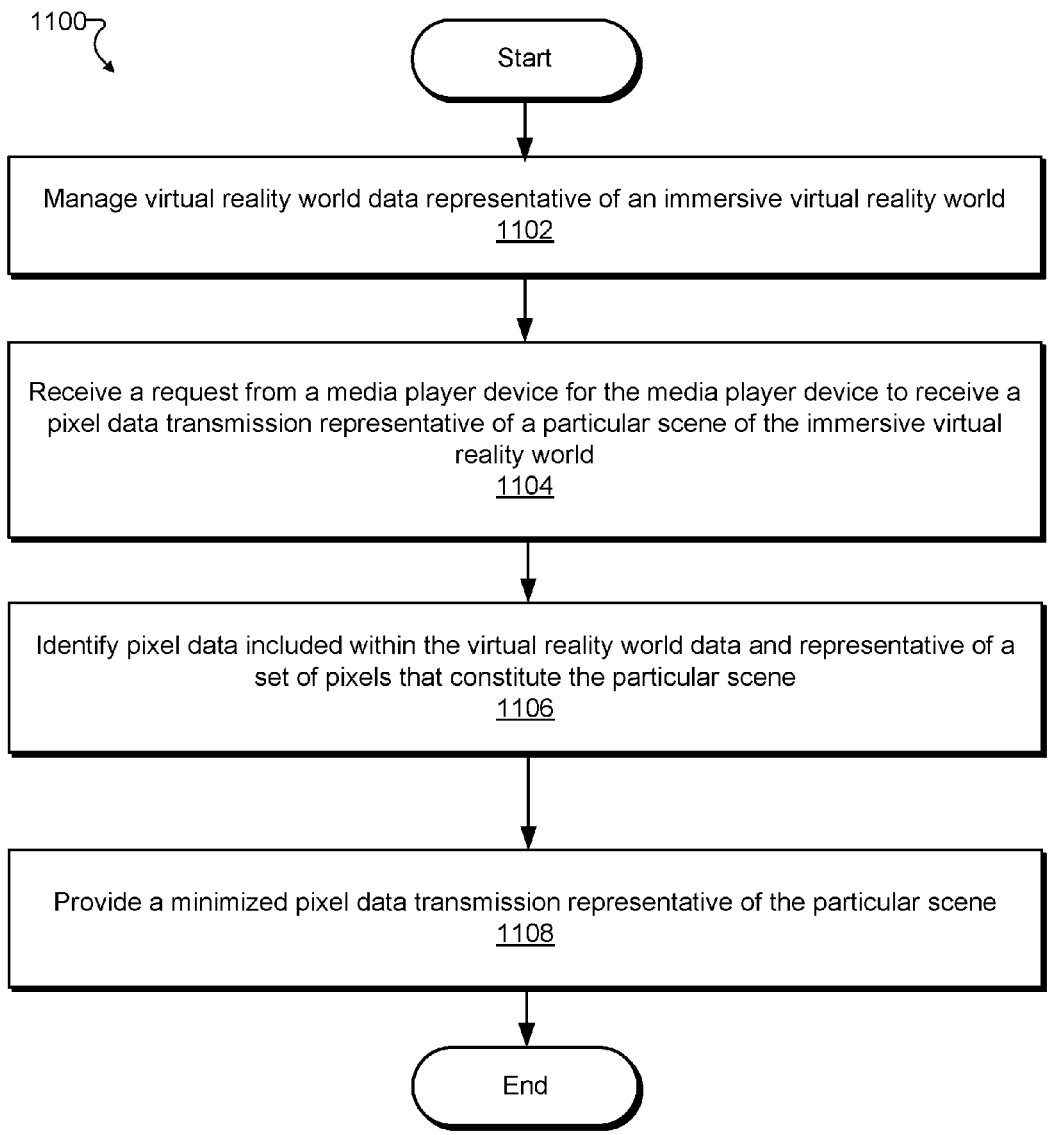
FIGS. 11 and 12 illustrate exemplary methods for minimizing pixel data transmission in a network-based virtual reality media delivery configuration according to principles described herein.

FIG. 11 illustrates an exemplary method 1100 for minimizing pixel data transmission in a network-based virtual reality media delivery configuration. While FIG. 11 illustrates exemplary operations according to one embodiment, other embodiments may omit, add to, reorder, and/or modify any of the operations shown in FIG. 11. One or more of the operations shown in FIG. 11 may be performed by system 400 and/or any implementation thereof.

In operation 1102, a virtual reality media provider system may manage virtual reality world data representative of an immersive virtual reality world. Operation 1102 may be performed in any of the ways described herein.

In operation 1104, the virtual reality media provider system may receive a request from a media player device for the media player device to receive a pixel data transmission representative of a particular scene of the immersive virtual reality world. For example, the virtual reality media provider system may receive the request from the media player device by way of a network. In some examples, the media player device may include a head-mounted display screen worn by a user to view the particular scene as the user experiences the immersive virtual reality world using the media player device. Operation 1104 may be performed in any of the ways described herein.

In operation 1106, the virtual reality media provider system may identify pixel data representative of a set of pixels that constitute the particular scene. For example, the pixel data may be included within the virtual reality world data. The virtual reality media provider system may perform operation 1106 in response to receiving the request in operation 1104. Operation 1106 may be performed in any of the ways described herein.

In operation 1108, the virtual reality media provider system may provide a minimized pixel data transmission representative of the particular scene to the media player device by way of the network. For example, the virtual reality media provider system may provide the minimized pixel data transmission in response to the request received in operation 1104. Operation 1108 may be performed in any of the ways described herein. For example, operation 1108 may be performed by 1) transmitting a viewable pixel data subset included in the pixel data and representative of pixels that correspond to one or more regions of the head-mounted display screen that are predetermined to be viewable by the user while the user experiences the immersive virtual reality world. Additionally, operation 1108 may be further performed by 2) abstaining from transmitting an unviewable pixel data subset included in the pixel data and representative of pixels that correspond to one or more regions of the head-mounted display screen that are predetermined to be unviewable by the user while the user experiences the immersive virtual reality world.

Figure 12:
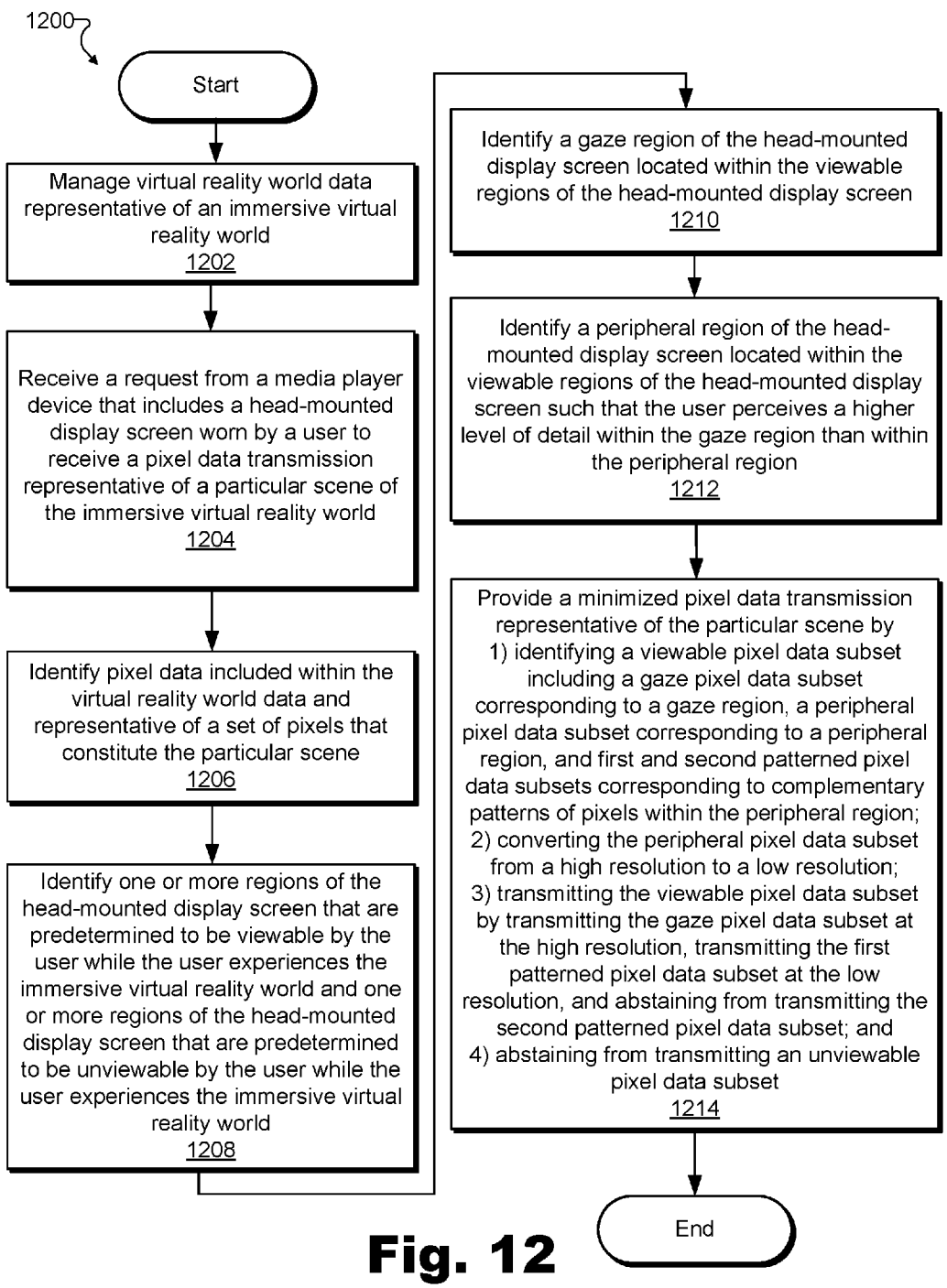

FIG. 12 illustrates an exemplary method 1200 for minimizing pixel data transmission in a network-based virtual reality media delivery configuration. While FIG. 12 illustrates exemplary operations according to one embodiment, other embodiments may omit, add to, reorder, and/or modify any of the operations shown in FIG. 12. One or more of the operations shown in FIG. 12 may be performed by system 400 and/or any implementation thereof.

In operation 1202, a virtual reality media provider system may manage virtual reality world data representative of an immersive virtual reality world. Operation 1202 may be performed in any of the ways described herein.

In operation 1204, the virtual reality media provider system may receive a request from a media player device for the media player device to receive a pixel data transmission representative of a particular scene of the immersive virtual reality world. For example, the virtual reality media provider system may receive the request from the media player device by way of a network. In some examples, the media player device may include a head-mounted display screen worn by a user to view the particular scene as the user experiences the immersive virtual reality world using the media player device. Operation 1204 may be performed in any of the ways described herein.

In operation 1206, the virtual reality media provider system may identify pixel data included within the virtual reality world data and representative of a set of pixels that constitute the particular scene. For example, operation 1206 may be performed in response to the request received in operation 1204. Operation 1206 may be performed in any of the ways described herein.

In operation 1208, the virtual reality media provider system may identify one or more regions of the head-mounted display screen that are predetermined to be viewable by the user while the user experiences the immersive virtual reality world and one or more regions of the head-mounted display screen that are predetermined to be unviewable by the user while the user experiences the immersive virtual reality world. Operation 1208 may be performed in any of the ways described herein.

In operation 1210, the virtual reality media provider system may identify a gaze region of the head-mounted display screen located within the one or more regions of the head-mounted display screen that are predetermined to be viewable by the user and associated with a direct gaze of the user. Operation 1210 may be performed in any of the ways described herein. For example, operation 1210 may be performed in response to the request received in operation 1204.

In operation 1212, the virtual reality media provider system may identify a peripheral region of the head-mounted display screen located within the one or more regions of the head-mounted display screen that are predetermined to be viewable by the user and associated with a peripheral vision of the user such that the user perceives a higher level of detail within the gaze region than within the peripheral region. Operation 1212 may be performed in any of the ways described herein. For example, operation 1212 may be performed in response to the request received in operation 1204.

In operation 1214, the virtual reality media provider system may provide a minimized pixel data transmission representative of the particular scene to the media player device by way of the network and in response to the request. Operation 1214 may be performed in any of the ways described herein. For example, the virtual reality media provider system may provide the minimized pixel data transmission by 1) identifying a viewable pixel data subset included in the pixel data and representative of pixels that correspond to the one or more regions of the head-mounted display screen that are predetermined to be viewable by the user. In some examples, the viewable pixel data subset may include a gaze pixel data subset including pixels corresponding to the gaze region of the head-mounted display screen, a peripheral pixel data subset including pixels corresponding to the peripheral region of the head-mounted display screen, a first patterned pixel data subset including pixels corresponding to a first pattern of pixels within the peripheral region of the head-mounted display screen, and a second patterned pixel data subset including pixels corresponding to a second pattern of pixels within the peripheral region of the head-mounted display screen and complementary to the first pattern of pixels. Additionally, the virtual reality media provider system may further provide the minimized pixel data transmission by 2) converting the peripheral pixel data subset from a high resolution to a low resolution lower than the high resolution, 3) transmitting the viewable pixel data subset by transmitting the gaze pixel data subset at the high resolution, transmitting the first patterned pixel data subset at the low resolution, and abstaining from transmitting the second patterned pixel data subset, and 4) abstaining from transmitting an unviewable pixel data subset included in the pixel data and representative of pixels that correspond to the one or more regions of the head-mounted display screen that are predetermined to be unviewable by the user.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 13:
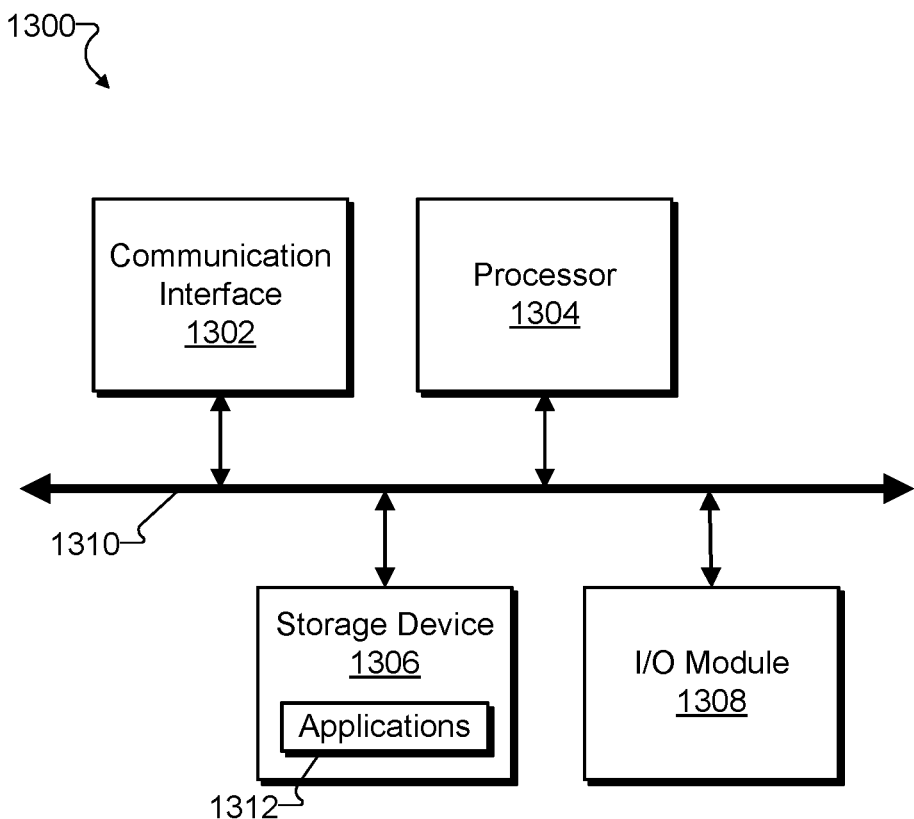
FIG. 13 illustrates an exemplary computing device according to principles described herein.

FIG. 13 illustrates an exemplary computing device 1300 that may be specifically configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may include one or more I/O modules configured to receive user input and provide user output. One or more I/O modules may be used to receive input for a single virtual reality experience. I/O module 1308 may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with management facility 402 of system 400 (see FIG. 4). Likewise, storage facility 404 of system 400 may be implemented by or within storage device 1306.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    managing, by a virtual reality media provider system, virtual reality world data representative of an immersive virtual reality world;
    receiving, by the virtual reality media provider system by way of a network, a request from a media player device for the media player device to receive a pixel data transmission representative of a particular scene of the immersive virtual reality world, the media player device including a head-mounted display screen worn by a user to view the particular scene as the user experiences the immersive virtual reality world using the media player device;

identifying, by the virtual reality media provider system in response to the request, pixel data included within the virtual reality world data and representative of a set of pixels that constitute the particular scene; and providing, by the virtual reality media provider system to the media player device by way of the network and in response to the request, a minimized pixel data transmission representative of the particular scene by transmitting a viewable pixel data subset included in the pixel data, the viewable pixel data subset representative of pixels that correspond to one or more regions of the head-mounted display screen that are predetermined to be viewable by the user while the user wears the head-mounted display screen to experience the immersive virtual reality world, and abstaining from transmitting an unviewable pixel data subset included in the pixel data, the unviewable pixel data subset representative of pixels that correspond to one or more regions of the head-mounted display screen that are predetermined to be unviewable by the user while the user wears the head-mounted display screen to experience the immersive virtual reality world;

wherein:

the one or more regions of the head-mounted display screen that are predetermined to be viewable by the user include non-overlapping portions of two overlapping shapes arranged on the head-mounted display screen; and the one or more regions of the head-mounted display screen that are predetermined to be unviewable by the user include overlapping portions of the two overlapping shapes, and regions of the head-mounted display screen bordering an outer boundary of the head-mounted display screen and exterior to the two overlapping shapes.

2. The method of claim 1, wherein:

the one or more regions of the head-mounted display screen that are predetermined to be viewable by the user include a first set of regions defined by a predetermined mask; and the one or more regions of the head-mounted display screen that are predetermined to be unviewable by the user include a second set of regions defined by the predetermined mask.

3. The method of claim 1, further comprising:

identifying, by the virtual reality media provider system in response to the request, a gaze region of the head-mounted display screen, the gaze region located within the one or more regions of the head-mounted display screen that are predetermined to be viewable by the user while the user wears the head-mounted display screen to experience the immersive virtual reality world and associated with a direct gaze of the user; and identifying, by the virtual reality media provider system in response to the request, a peripheral region of the head-mounted display screen, the peripheral region located within the one or more regions of the head-mounted display screen that are predetermined to be viewable by the user while the user wears the head-mounted display screen to experience the immersive virtual reality world and associated with a peripheral vision of the user such that the user perceives a higher level of detail within the gaze region than within the peripheral region;

wherein the transmitting of the viewable pixel data subset includes identifying a gaze pixel data subset of the viewable pixel data subset, the gaze pixel data subset including pixels corresponding to the gaze region of the head-mounted display screen, identifying a peripheral pixel data subset of the viewable pixel data subset, the peripheral pixel data subset including pixels corresponding to the peripheral region of the head-mounted display screen, converting the peripheral pixel data subset from a high resolution to a low resolution lower than the high resolution, transmitting the gaze pixel data subset at the high resolution, and transmitting the peripheral pixel data subset at the low resolution.

4. The method of claim 3, further comprising receiving, by the virtual reality media provider system from the media player device by way of the network, eye tracking data representative of eye movements of the user as the user experiences the immersive virtual reality world;

wherein the identifying of the gaze region and the identifying of the peripheral region are dynamically performed based on the received eye tracking data representative of the eye movements of the user.

5. The method of claim 3, further comprising identifying, by the virtual reality media provider system in response to the request, a second peripheral region of the head-mounted display screen, the second peripheral region located within the one or more regions of the head-mounted display screen that are predetermined to be viewable by the user while the user wears the head-mounted display screen to experience the immersive virtual reality world and associated with the peripheral vision of the user such that the user perceives a higher level of detail within the peripheral region than within the second peripheral region;

wherein the transmitting of the viewable pixel data subset further includes identifying a second peripheral pixel data subset of the viewable pixel data subset, the second peripheral pixel data subset including pixels corresponding to the second peripheral region of the head-mounted display screen, converting the second peripheral pixel data subset from the high resolution to a second low resolution lower than both the high resolution and the low resolution, and transmitting the second peripheral pixel data subset at the second low resolution.

6. The method of claim 1, further comprising:

identifying, by the virtual reality media provider system in response to the request, a gaze region of the head-mounted display screen, the gaze region located within the one or more regions of the head-mounted display screen that are predetermined to be viewable by the user while the user wears the head-mounted display screen to experience the immersive virtual reality world and associated with a direct gaze of the user; and identifying, by the virtual reality media provider system in response to the request, a peripheral region of the head-mounted display screen, the peripheral region located within the one or more regions of the head-mounted display screen that are predetermined to be viewable by the user while the user wears the head-mounted display screen to experience the immersive virtual reality world and associated with a peripheral vision of the user such that the user perceives a higher level of detail within the gaze region than within the peripheral region;

wherein the transmitting of the viewable pixel data subset includes identifying a gaze pixel data subset of the viewable pixel data subset, the gaze pixel data subset including pixels corresponding to the gaze region of the head-mounted display screen, identifying a first patterned pixel data subset of the viewable pixel data subset, the first patterned pixel data subset including pixels corresponding to a first pattern of pixels within the peripheral region of the head-mounted display screen, identifying a second patterned pixel data subset of the viewable pixel data subset, the second patterned pixel data subset including pixels corresponding to a second pattern of pixels within the peripheral region of the head-mounted display screen, the second pattern of pixels complementary to the first pattern of pixels, transmitting the gaze pixel data subset, transmitting the first patterned pixel data subset, and abstaining from transmitting the second patterned pixel data subset.

7. The method of claim 6, further comprising receiving, by the virtual reality media provider system from the media player device by way of the network, eye tracking data representative of eye movements of the user as the user experiences the immersive virtual reality world;

wherein the identifying of the gaze region and the identifying of the peripheral region are dynamically performed based on the received eye tracking data representative of the eye movements of the user.

8. The method of claim 1, further comprising:

detecting, by the virtual reality media provider system prior to the providing of the minimized pixel data transmission representative of the particular scene, a network condition associated with a connection between the virtual reality media provider system and the media player device by way of the network;

wherein the providing of the minimized pixel data transmission representative of the particular scene is based on the detecting of the network condition.

9. The method of claim 1, further comprising:

detecting, by the virtual reality media provider system concurrent with the providing of the minimized pixel data transmission representative of the particular scene, a network condition associated with a connection between the virtual reality media provider system and the media player device by way of the network; and ceasing, by the virtual reality media provider subsystem based on the detecting of the network condition, the abstaining from transmitting the unviewable pixel data subset by transmitting the unviewable pixel data subset along with the viewable data pixel subset.

10. The method of claim 1, embodied as computer-executable instructions on at least one non-transitory computer-readable medium.

11. The method of claim 1, wherein the one or more regions of the head-mounted display screen that are predetermined to be unviewable by the user while the user wears the head-mounted display screen to experience the immersive virtual reality world are unviewable by the user due to at least one of:

a configuration of lenses within a head-mounted virtual reality device that includes the head-mounted display screen;

a relative size of the head-mounted display screen;

a distance from the head-mounted display screen to the lenses when the user wears the head-mounted display screen; and a distance from the lenses to eyes of the user when the user wears the head-mounted display screen.

12. A method comprising:

managing, by a virtual reality media provider system, virtual reality world data representative of an immersive virtual reality world;

receiving, by the virtual reality media provider system by way of a network, a request from a media player device for the media player device to receive a pixel data transmission representative of a particular scene of the immersive virtual reality world, the media player device including a head-mounted display screen worn by a user to view the particular scene as the user experiences the immersive virtual reality world using the media player device;

identifying, by the virtual reality media provider system in response to the request, pixel data included within the virtual reality world data and representative of a set of pixels that constitute the particular scene;

identifying, by the virtual reality media provider system, one or more regions of the head-mounted display screen that are predetermined to be viewable by the user while the user wears the head-mounted display screen to experience the immersive virtual reality world and one or more regions of the head-mounted display screen that are predetermined to be unviewable by the user while the user wears the head-mounted display screen to experience the immersive virtual reality world;

identifying, by the virtual reality media provider system in response to the request, a gaze region of the head-mounted display screen located within the one or more regions of the head-mounted display screen that are predetermined to be viewable by the user and associated with a direct gaze of the user;

identifying, by the virtual reality media provider system in response to the request, a peripheral region of the head-mounted display screen located within the one or more regions of the head-mounted display screen that are predetermined to be viewable by the user and associated with a peripheral vision of the user such that the user perceives a higher level of detail within the gaze region than within the peripheral region; and providing, by the virtual reality media provider system to the media player device by way of the network and in response to the request, a minimized pixel data transmission representative of the particular scene by identifying a viewable pixel data subset included in the pixel data and representative of pixels that correspond to the one or more regions of the head-mounted display screen that are predetermined to be viewable by the user, the viewable pixel data subset including a gaze pixel data subset including pixels corresponding to the gaze region of the head-mounted display screen, a peripheral pixel data subset including pixels corresponding to the peripheral region of the head-mounted display screen,
a first patterned pixel data subset including pixels corresponding to a first pattern of pixels within the peripheral region of the head-mounted display screen, and
a second patterned pixel data subset including pixels corresponding to a second pattern of pixels within the peripheral region of the head-mounted display screen and complementary to the first pattern of pixels,
converting the peripheral pixel data subset from a high resolution to a low resolution lower than the high resolution,
transmitting the viewable pixel data subset by
transmitting the gaze pixel data subset at the high resolution,
transmitting the first patterned pixel data subset at the low resolution, and
abstaining from transmitting the second patterned pixel data subset, and
abstaining from transmitting an unviewable pixel data subset included in the pixel data and representative of pixels that correspond to the one or more regions of the head-mounted display screen that are predetermined to be unviewable by the user.

13. The method of claim 12, embodied as computer-executable instructions on at least one non-transitory computer-readable medium.

14. A system comprising:
at least one physical computing device that:
manages virtual reality world data representative of an immersive virtual reality world;
receives, by way of a network, a request from a media player device for the media player device to receive a pixel data transmission representative of a particular scene of the immersive virtual reality world, the media player device including a head-mounted display screen worn by a user to view the particular scene as the user experiences the immersive virtual reality world using the media player device;
identifies, in response to the request, pixel data included within the virtual reality world data and representative of a set of pixels that constitute the particular scene; and
provides, to the media player device by way of the network and in response to the request, a minimized pixel data transmission representative of the particular scene by
transmitting a viewable pixel data subset included in the pixel data, the viewable pixel data subset representative of pixels that correspond to one or more regions of the head-mounted display screen that are predetermined to be viewable by the user while the user wears the head-mounted display screen to experience the immersive virtual reality world, and
abstaining from transmitting an unviewable pixel data subset included in the pixel data, the unviewable pixel data subset representative of pixels that correspond to one or more regions of the head-mounted display screen that are predetermined to be unviewable by the user while the user wears the head-mounted display screen to experience the immersive virtual reality world;
wherein:
the one or more regions of the head-mounted display screen that are predetermined to be viewable by the user include non-overlapping portions of two overlapping shapes arranged on the head-mounted display screen; and
the one or more regions of the head-mounted display screen that are predetermined to be unviewable by the user include
overlapping portions of the two overlapping shapes, and
regions of the head-mounted display screen bordering an outer boundary of the head-mounted display screen and exterior to the two overlapping shapes.

15. The system of claim 14, wherein the at least one physical computing device further:
identifies, in response to the request, a gaze region of the head-mounted display screen, the gaze region located within the one or more regions of the head-mounted display screen that are predetermined to be viewable by the user while the user wears the head-mounted display screen to experience the immersive virtual reality world and associated with a direct gaze of the user; and
identifies, in response to the request, a peripheral region of the head-mounted display screen, the peripheral region located within the one or more regions of the head-mounted display screen that are predetermined to be viewable by the user while the user wears the head-mounted display screen to experience the immersive virtual reality world and associated with a peripheral vision of the user such that the user perceives a higher level of detail within the gaze region than within the peripheral region;
wherein the at least one physical computing device transmits the viewable pixel data subset by
identifying a gaze pixel data subset of the viewable pixel data subset, the gaze pixel data subset including pixels corresponding to the gaze region of the head-mounted display screen,
identifying a peripheral pixel data subset of the viewable pixel data subset, the peripheral pixel data subset including pixels corresponding to the peripheral region of the head-mounted display screen,
converting the peripheral pixel data subset from a high resolution to a low resolution lower than the high resolution,
transmitting the gaze pixel data subset at the high resolution, and
transmitting the peripheral pixel data subset at the low resolution.

16. The system of claim 15, wherein the at least one physical computing device further:
receives, from the media player device by way of the network, eye tracking data representative of eye movements of the user as the user experiences the immersive virtual reality world;
wherein the at least one physical computing device dynamically performs the identifying of the gaze region and the identifying of the peripheral region based on the received eye tracking data representative of the eye movements of the user.

17. The system of claim 15, wherein the at least one physical computing device further:
identifies, in response to the request, a second peripheral region of the head-mounted display screen, the second peripheral region located within the one or more regions of the head-mounted display screen that are predetermined to be viewable by the user while the user wears the head-mounted display screen to experience the immersive virtual reality world and associated with the peripheral vision of the user such that the user perceives a higher level of detail within the peripheral region than within the second peripheral region;

wherein the at least one physical computing device transmits the viewable pixel data subset by identifying a second peripheral pixel data subset of the viewable pixel data subset, the second peripheral pixel data subset including pixels corresponding to the second peripheral region of the head-mounted display screen, converting the second peripheral pixel data subset from the high resolution to a second low resolution lower than both the high resolution and the low resolution, and transmitting the second peripheral pixel data subset at the second low resolution.

18. The system of claim 14, wherein the at least one physical computing device further:

identifies, in response to the request, a gaze region of the head-mounted display screen, the gaze region located within the one or more regions of the head-mounted display screen that are predetermined to be viewable by the user while the user wears the head-mounted display screen to experience the immersive virtual reality world and associated with a direct gaze of the user; and identifies, in response to the request, a peripheral region of the head-mounted display screen, the peripheral region located within the one or more regions of the head-mounted display screen that are predetermined to be viewable by the user while the user wears the head-mounted display screen to experience the immersive virtual reality world and associated with a peripheral vision of the user such that the user perceives a higher level of detail within the gaze region than within the peripheral region;

wherein the at least one physical computing device transmits the viewable pixel data subset by identifying a gaze pixel data subset of the viewable pixel data subset, the gaze pixel data subset including pixels corresponding to the gaze region of the head-mounted display screen, identifying a first patterned pixel data subset of the viewable pixel data subset, the first patterned pixel data subset including pixels corresponding to a first pattern of pixels within the peripheral region of the head-mounted display screen, identifying a second patterned pixel data subset of the viewable pixel data subset, the second patterned pixel data subset including pixels corresponding to a second pattern of pixels within the peripheral region of the head-mounted display screen, the second pattern of pixels complementary to the first pattern of pixels, transmitting the gaze pixel data subset, transmitting the first patterned pixel data subset, and abstaining from transmitting the second patterned pixel data subset.

19. The system of claim 14, wherein the at least one physical computing device further:

detects, concurrent with providing of the minimized pixel data transmission representative of the particular scene, a network condition associated with a connection between the virtual reality media provider system and the media player device by way of the network; and ceases, based on the detection of the network condition, the abstention from transmitting the unviewable pixel data subset by transmitting the unviewable pixel data subset along with the viewable data pixel subset.

* * * * *